(12) United States Patent  (10) Patent No.: US 6,700,741 B2
Inoue et al.  (45) Date of Patent: Mar. 2, 2004

(54) DISK CARTRIDGE WITH A PLURALITY OF SHUTTER MEMBERS

(75) Inventors: Naoki Inoue, Kanagawa (JP); Manabu Obata, Kanagawa (JP)

(73) Assignee: Sony Corporation, Tokyo (JP)

( * ) Notice: Subject to any disclaimer, the term of this patent is extended or adjusted under 35 U.S.C. 154(b) by 130 days.

(21) Appl. No.: 09/858,759

(22) Filed: May 16, 2001

(65) Prior Publication Data

US 2001/0046104 A1 Nov. 29, 2001

(30) Foreign Application Priority Data

May 17, 2000 (JP) ..................... P2000-145602
May 17, 2000 (JP) ..................... P2000-145617
May 17, 2000 (JP) ..................... P2000-145625

(51) Int. Cl.$^7$ .............................................. G11B 33/12
(52) U.S. Cl. ...................................... 360/133; 369/291
(58) Field of Search ........................ 360/133; 369/291

(56) References Cited

U.S. PATENT DOCUMENTS

| 4,471,397 | A | * | 9/1984 | Cloutier ...................... 360/133 |
| 4,586,102 | A | | 4/1986 | Bresson ....................... 360/133 |
| 4,724,962 | A | * | 2/1988 | Watanabe et al. ............ 360/133 |
| 5,278,717 | A | | 1/1994 | Sasaki et al. ................ 360/133 |
| 5,537,389 | A | * | 7/1996 | Kuwa et al. .................. 369/291 |
| 5,570,342 | A | * | 10/1996 | Kosaka ........................ 369/291 |
| 6,021,031 | A | | 2/2000 | Hales et al. ................. 360/133 |
| 6,111,726 | A | * | 8/2000 | Clark et al. .................. 360/133 |
| 6,205,116 | B1 | * | 3/2001 | Hashimoto ................... 369/291 |
| 6,356,527 | B1 | * | 3/2002 | Shiomi et al. ............... 369/291 |
| 6,473,392 | B2 | * | 10/2002 | Shiomi et al. .............. 369/291 |

FOREIGN PATENT DOCUMENTS

| JP | 11 345475 | | 12/1999 |
| JP | 2000-30394 | * | 1/2000 |

OTHER PUBLICATIONS

Patent Abstract of Japan vol. 2000, No. 03, Mar. 30, 2000.

* cited by examiner

Primary Examiner—Brian E. Miller
(74) Attorney, Agent, or Firm—Frommer Lawrence Haug LLP; William S. Frommer; Leonard J. Santisi

(57) ABSTRACT

A disk cartridge in which a pair of shutter members can be opened and closed smoothly and reliably, and a dust-proof property and an airtightness of a large opening portion can be increased by reducing a space between a pair of shutter members and a cartridge housing as much as possible. The disk cartridge comprises a cartridge housing in which a disk compartment is formed between an upper shell and a middle shell by overlapping the upper shell, the middle shell and the lower shell and the middle shell is supported by the upper shell and the lower shell so as to become freely rotatable, an optical disk rotatably stored within the disk compartment and a pair of shutter members attached to the middle shell in such a manner that they can be moved in the plane direction on the same plane. A shutter opening and closing mechanism for opening and closing opening portions by moving the pair of shutter members based rotation of the middle shell.

12 Claims, 26 Drawing Sheets

F I G. 21A 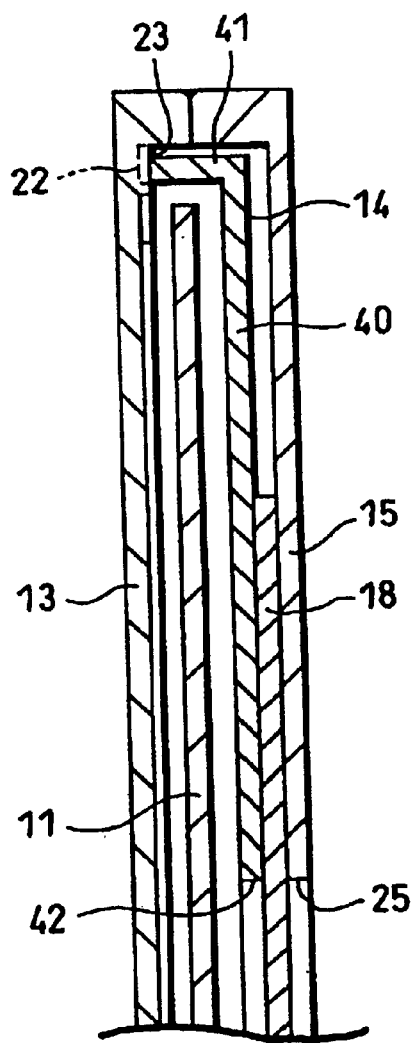
F I G. 21B 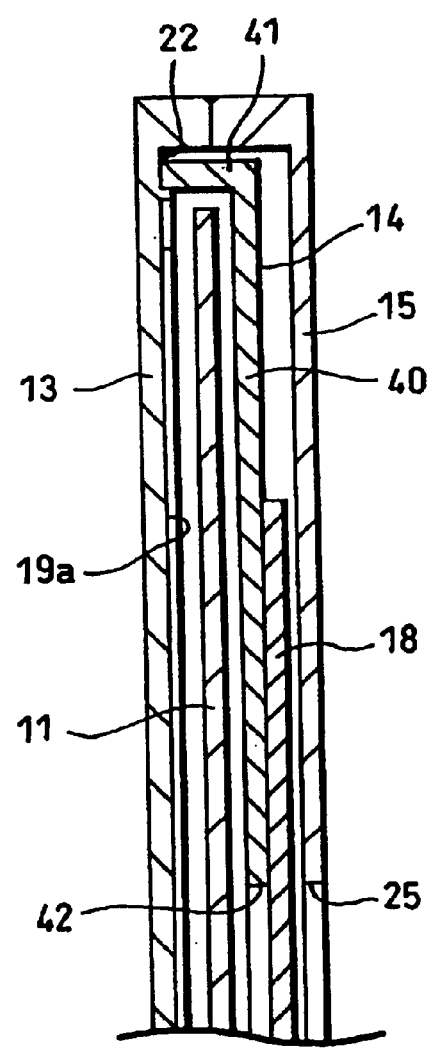

DISK CARTRIDGE WITH A PLURALITY OF SHUTTER MEMBERS

BACKGROUND OF THE INVENTION

1. Field of the Invention

The present invention relates to a disk cartridge having a cartridge housing in which a disk-like recording medium such as an optical disk, a magnetooptical disk and a magnetic disk is stored in a disk compartment so as to become freely rotatable, and particularly to a disk cartridge in which a pair of shutter members are opened and closed to open and close an opening portion by rotating a middle shell which forms a disk compartment between it and an upper shell or a lower shell and a part of a disk-like recording medium is exposed from the opening portion when the opening portion is opened.

2. Description of the Related Art

As a disk cartridge in which a disk-like recording medium in and/or from which audio information, video information or information such as computer data can be recorded and/or reproduced is rotatably stored in a cartridge housing, there is known a disk cartridge having an arrangement shown in FIG. 27, for example. This disk cartridge 1 is a disk cartridge incorporating therein a write once magnetooptical disk 4 in which a user can record and write information such as computer data later on. This disk cartridge has an appearance shown in FIG. 27.

This disk cartridge 1 includes a cartridge housing 2 comprised of a pair of an upper shell 2a and a lower shell 2b, a magnetooptical disk 4 rotatably stored within a disk compartment 3 of this cartridge housing, and the like. The cartridge housing 2 has on its upper and lower surfaces an upper and lower opening portion 5 which is extended from the central portion to one side. This opening portion 5 can be opened and closed by a shutter member 6 which can be slid along one side. Reference numeral 6a designates a presser member which can prevent the tip end portion of the shutter member 6 from being extracted.

A disk-like metal center hub 7 is provided at the central portion of the magnetooptical disk 4. This center hub 7 is disposed at the position opposing to the inner end portion of the opening portion 5, i.e., at substantially the central portion of the cartridge housing 2. A turntable provided on an information recording and reproducing apparatus body side is mounted on this center hub 7 and the magnetooptical disk 4 is fixed to the center hub by chucking of the turntable, whereby the magnetooptical disk 4 is rotated at a predetermined velocity (e.g., constant linear velocity). In this case, an information signal is recorded on or reproduced from the magnetooptical disk 4 by action of a magnetooptical pickup device whose head portion is inserted into the opening portion 5.

However, in the conventional disk cartridge having the above arrangement, the shutter member 6 which opens and closes the opening portion 5 has a U-like shaped cross-section. This shutter member 6 is fitted into one side of the cartridge housing 2 and the shutter member 6 is slid along one side of the cartridge housing to thereby open and close the opening portion 5. For this reason, it is unavoidable that a large space is produced between the cartridge housing 2 and the shutter member 6, and therefore the disk cartridge cannot be prevented from being smudged by very small dust particles and the like.

In recent years, in the stream in which an optical disk is increasing its storage capacity/increasing its recording density, a recording pattern is becoming narrower in pitch and is increasing in linear density. When a recording surface of an optical disk or a magnetooptical disk is smudged by dust, the read or write beam is shielded, also when the information recording surface of the optical disk is damaged by scratches, information cannot be read or written normally. For this reason, in the conventional disk cartridge, as shown in FIG. 27, the shutter member 6 having substantially the U-like shaped cross-section is attached to one side of the cartridge housing 2 so as to become slidable and is slid along one side of the cartridge housing thereby to open and close the opening portion 5 so that the information recording surface of the optical disk or the like can be protected.

However, as the optical disk is further increased in storage capacity or recording density, very small dusts particles which are not so influential in the prior art becomes more influential over reading and writing of data. Therefore, the shutter member having the above U-like shape cannot prevent the disk cartridge from being smudged by very small dusts particles. In this case, when the information recording surface of the magnetooptical disk 4 is smudged by very small dusts particles entering into the cartridge housing 2, the information recording surface of the magnetooptical disk is damaged by dusts so that information cannot be read out from and written in the magnetooptical disk normally.

In the above conventional disk cartridge 1, the shutter member 6 is located on the disk cartridge at its position in which users can easily touch the shutter member. There is then the risk that a user will slide the shutter member 6 to open the opening portion 5 by mistake. In addition, since the shutter member 6 is linearly slid along one side of the cartridge housing 2, there arises a problem that the surface area of the cartridge housing 2 cannot be reduced.

SUMMARY OF THE INVENTION

In view of the above problems encountered with the conventional disk cartridge, it is an object of the present invention to provide a disk cartridge in which the above problems can be solved and in which a middle shell is made rotatable and a pair of shutter members are opened and closed based on the rotation of the middle shell whereby the pair of shutter members can smoothly and reliably be opened and closed and a dustproof property and airtightness of the large opening portion can be improved by reducing a space between the pair of shutter members and the cartridge housing as much as possible.

In order to solve the above problems and in order to attain the above objects, a disk cartridge of the present invention is comprised of a cartridge housing in which a disk compartment is formed between an upper shell and a middle shell or between the middle shell and a lower shell by overlapping the upper shell, the middle shell and the lower shell and in which the middle shell can be supported by the upper shell and the lower shell so as to become freely rotatable, a disk-like recording medium rotatably stored within the disk compartment and a pair of shutter members attached to the middle shell in such a manner that they can be moved in the flat surface direction on the same plane, wherein a shutter opening and closing mechanism for opening and closing an opening portion by moving the pair of shutter members based on the rotation of the middle shell is provided.

A disk cartridge according to the present invention is characterized in that the pair of shutter members are comprised of a combination of two substantially semicircular same plate materials and the shutter members are symmetrically disposed on one surface side of the middle shell across the opening portion.

A disk cartridge according to the present invention is characterized in that the shutter opening and closing mechanism includes rotary coupling portions respectively provided on one side portions of the pair of shutter members and which are coupled to the middle shell so as to become freely rotatable and movement coupling portions respectively provided on the other side portions of the respective shutter members and which are coupled to the lower shell or the upper shell so as to become movable relatively, and the shutter opening and closing mechanism opens and closes the opening portion by rotating the pair of shutter members around the rotary coupling members based on the rotation of the middle shell to thereby relatively move the movement coupling portions.

A disk cartridge according to the present invention is characterized in that the rotary coupling portion is comprised of a combination of a shaft portion provided on one of the pair of shutter members and the middle shell and an engagement hole provided on the other of the pair of shutter members and the middle shell, the movement coupling portion is comprised of a combination of a guide groove provided on one of the pair of shutter members and the lower shell or the upper shell and an operation convex portion provided on the other of the pair of shutter members and the lower shell or the upper shell, and the pair of shutter members are enabled to open and close by moving the guide groove along the operation convex portion based on the rotation of the middle shell.

A disk cartridge according to the present invention is characterized in that the opening portion is extended in the linear direction through respective central portions of the middle shell and the lower shell or the middle shell and the upper shell.

A disk cartridge according the present invention is characterized in that an elevation mechanism for moving the middle shell in the direction perpendicular to the rotation direction based on the rotation of the middle shell so that the middle shell is pressed against the lower shell or the upper shell is provided.

A disk cartridge of the present invention is characterized in that the shutter opening and closing mechanism includes a pair of guide grooves provided on one of the pair of shutter members and the cartridge housing and a pair of operation convex portions provided on the other of the pair of shutter members and the cartridge housing and which are slidably engaged with the guide grooves and the pair of shutter members are enabled to open and close the opening portion by moving the guide grooves along the operation convex portions based on the rotation of the middle shell.

A disk cartridge of the present invention is characterized in that the pair of shutter members are comprised of a combination of a pair of substantially semicircular same plate materials, the pair of shutter members are symmetrically disposed on one surface side of the middle shell across the opening portion, the guide grooves are provided on one side portions of chord sides of the respective shutter members and pivots provided on the other side portions of the chord sides are supported by the middle shell so as to become freely rotatable.

A disk of the present invention is characterized in that the elevation mechanism is comprised of a plurality of circular-arc-like cam grooves or cam convex portions provided in the circumferential direction of the upper shell or the lower shell at a predetermined interval and which are concaved or convexed in the direction in which the upper shell, the middle shell and the lower shell are overlapped and cam convex portions or cam grooves provided in the circumferential direction of the middle shell at a predetermined interval and which are slidably engaged with the cam grooves or the cam convex portions.

A disk cartridge according to the present invention is characterized by comprising a gear portion provided on the outer peripheral surface of the middle shell over a predetermined range of the circumferential direction and an opening window from which a part of the gear portion is exposed and which is bored through the side surface of the upper shell and the lower shell.

A disk cartridge according to the present invention is characterized in that the pair of shutter members are comprised of a combination of a pair of substantially semicircular same plate materials, the pair of shutter members are symmetrically disposed on one surface of the middle shell across the opening portion, the guide groove is provided on one side portion of a chord side in each of the shutter members and a shaft portion provided on the other side portion of the chord side is rotatably supported by the middle shell.

A disk cartridge according to the present invention is characterized in that a pair of guide grooves are provided on one of the pair of shutter members and the cartridge housing, a pair of operation convex portions which are slidably engaged with the guide grooves are provided on the other of the pair of shutter members and the cartridge housing, the guide grooves are moved along the operation convex portions based on the rotation of the middle shell, whereby the pair of shutter members are enabled to open and close said open and close portion.

A disk cartridge according to the present invention is characterized in that the opening portion is extended in the linear direction through central portions of the middle shell and the lower shell or the middle shell and the upper shell.

With the above arrangement, in the disk cartridge comprising the cartridge housing having the disk compartment, the disk-like recording medium and the pair of shutter members, since the disk cartridge of the present invention includes the shutter opening and closing mechanism for moving the pair of shutter members based on the rotation of the middle shell, the pair of shutter members can smoothly and reliably be rotated by rotating the middle shell. Therefore, the disk compartment can be prevented from being smudged by very small dusts particles and the like by reducing the space between the pair of shutter members and the cartridge housing, and the dustproof property of the cartridge housing can be improved. Moreover, the disk cartridge can be reduced in thickness and improved in space factor so that the whole of the disk cartridge can be made compact and thin.

In the disk cartridge of the present invention, since the pair of shutter members are comprised of a combination of two substantially semicircular same plate materials, the opening portion of the wide range can be opened and closed while the areas of the shutter members are being reduced. Thus, while an efficiency with which the opening portion is opened and closed is being increased, the whole of the disk cartridge can be made compact and thin.

In the disk cartridge of the present invention, since the shutter opening and closing mechanism includes the rotary coupling portion and the movement coupling portion so that the pair of shutter members are opened and closed based on the rotation of the middle shell to thereby open and close the opening portion, the pair of shutter members can smoothly and reliably be rotated.

In the disk cartridge as of the present invention, since the rotary coupling portion is comprised of a combination of a shaft portion and an engagement hole and the movement coupling portion is comprised of a combination of a guide groove and an operation convex portion, the pair of shutter members can be operated with high reliability and the opening portion can smoothly and reliably be opened and closed.

In the disk cartridge of the present invention, since the opening portion is extended in the diametrical direction through the central portions of the middle shell and the like, two head portions can simultaneously be faced into the opening portion, whereby two operations (e.g., writing and reading of information signal can be carried out simultaneously.

In the disk cartridge of the present invention, comprising the cartridge housing having the disk compartment, the disk-like recording medium and the pair of shutter members, since the disk cartridge comprises the shutter opening and closing mechanism for opening and closing the opening portion by moving the pair of shutter members based on the rotation of the middle shell and the elevation mechanism for moving the middle shell in the direction perpendicular to the rotation direction based on the rotation of the middle shell, the pair of shutter members can smoothly and reliably be rotated by rotating the middle shell and the middle shell can be ascended and descended and pressed against the upper shell or the lower shell when the middle shell is rotated. Therefore, the space can be removed or reduced by closely contacting the middle shell with the upper shell or the lower shell so that the disk compartment can be prevented from being smudged by very small dusts and the like, thereby improving the dustproof property of the cartridge housing. Moreover, the thickness of the cartridge housing can be decreased and the space factor can be improved and the whole of the disk cartridge can be made compact and thin.

In the disk cartridge of the present invention, since the pair of guide grooves are provided on one of the pair of shutter members and the cartridge housing and the pair of operation convex portions are provided on the other of the pair of guide grooves and the pair of operation convex portions and the guide grooves are moved along the operation convex portions based on the rotation of the middle shell, the pair of shutter members can smoothly and reliably be moved, whereby the opening portion of the wide range can be opened and closed.

In the disk cartridge of the present invention, since the pair of shutter members are comprised of the combination of two substantially semicircular same plate materials, the guide grooves are provided on one side portions of the respective shutter members, the pivots are provided on the other side portions and the pivots are supported by the middle shell so as to become freely rotatable, the opening portion of the wide range can be opened and closed while the areas of the shutter members are being reduced. Thus, an efficiency with which the opening portion is opened and closed can be increased, and the whole of the disk cartridge can be made compact and thin.

In the disk cartridge of the present invention, since the cam grooves or the cam convex portions are provided on the upper shell or the lower shell and the cam convex portions or the cam grooves are provided on the middle shell to thereby constitute the elevation mechanism, the pair of shutter members can be sandwiched by the upper shell or the lower shell and the middle shell as the middle shell is rotated, the space can be removed by closely contacting the middle shell with the upper shell or the lower shell so that the disk compartment can be prevented from being smudged by very small dusts particles and the like. Thus, the dustproof property of the cartridge housing can be improved.

In the disk cartridge including the cartridge housing having the disk compartment, the disk-like recording medium and the pair of shutter members, according to the present invention, since the gear portion formed around the outer peripheral surface of the middle shell is exposed from the opening window provided on the side surface of the upper shell and the lower shell, the middle shell can be rotated by the simple shutter opening and closing mechanism such as the rack rod disposed on the outside, and the pair of shutter members can smoothly and reliably be rotated based on the rotation of the middle shell. Therefore, the shutter opening and closing mechanism can be constructed extremely easily. In addition, the disk compartment can be prevented from being smudged by very small dusts particles and the like by miniaturizing the space between the pair of shutter members and the cartridge housing. Thus, the dustproof effect of the cartridge housing can be improved and the disk cartridge can be decreased in thickness and improved in space factor. There can be achieved the effects that the whole of the disk cartridge can be made compact and thin.

According to the disk cartridge of the present invention, since the disk cartridge has the arrangement in which the pair of shutter members are comprised of a combination of the same two substantially semicircular plate materials, the respective shutter members are symmetrically disposed across the opening portion, the guide grooves are provided on one side portions of the chord sides of the respective shutter members and the shaft portions provided on the other side portions are rotatably supported to the middle shell, the opening portion of the wide range can be opened and closed while the areas of the shutter members are being decreased. Thus, an efficiency with which the opening portion is opened and closed can be improved and the whole of the disk cartridge can be made compact and thin.

According to the disk cartridge of the present invention, since the disk cartridge has the arrangement in which the pair of guide grooves are provided on one of the pair of shutter members and the cartridge housing and the pair of operation convex portions are provided on the other of the pair of shutter members and the cartridge housing so that the guide grooves may be moved along the operation convex portions based on the rotation of the middle shell, the pair of shutter members are opened and closed by the rotation of the middle shell to thereby open and close the opening portion, and hence the pair of shutter members can be rotated smoothly and reliably.

According to the disk cartridge of the present invention, since the disk cartridge has the arrangement in which the opening portion is extended through the central portion of the cartridge housing to the diametrical direction of the disk-like recording medium, the two head portions can be inserted into and ejected from the opening portion simultaneously so that the two head portions are faced into the opening portion simultaneously and two operations (e.g., writing and reading of an information signal, writing or reading of an information signal at two places at the same time, etc.) can be carried out simultaneously.

BRIEF DESCRIPTION OF THE DRAWINGS

FIG. 20 is a diagram to which reference will be made in explaining the manner in which the middle shell is ascended and descended relative to the upper shell when the disk cartridge shown in FIG. 1 is opened and closed, wherein

FIG. 21 is a diagram to which reference will be made in explaining the manner in which the middle shell is ascended and descended when the disk cartridge shown in FIG. 20 is opened and closed, wherein FIG. 21A is a cross-sectional view showing the state in which a cam portion of the middle shell is urged against a lift up portion of the upper shell and FIG. 21B is a cross-sectional view showing the state in which a cam portion of the middle shell is inserted into a cam groove of the upper shell;

DESCRIPTION OF THE PREFERRED EMBODIMENTS

Figure 1:
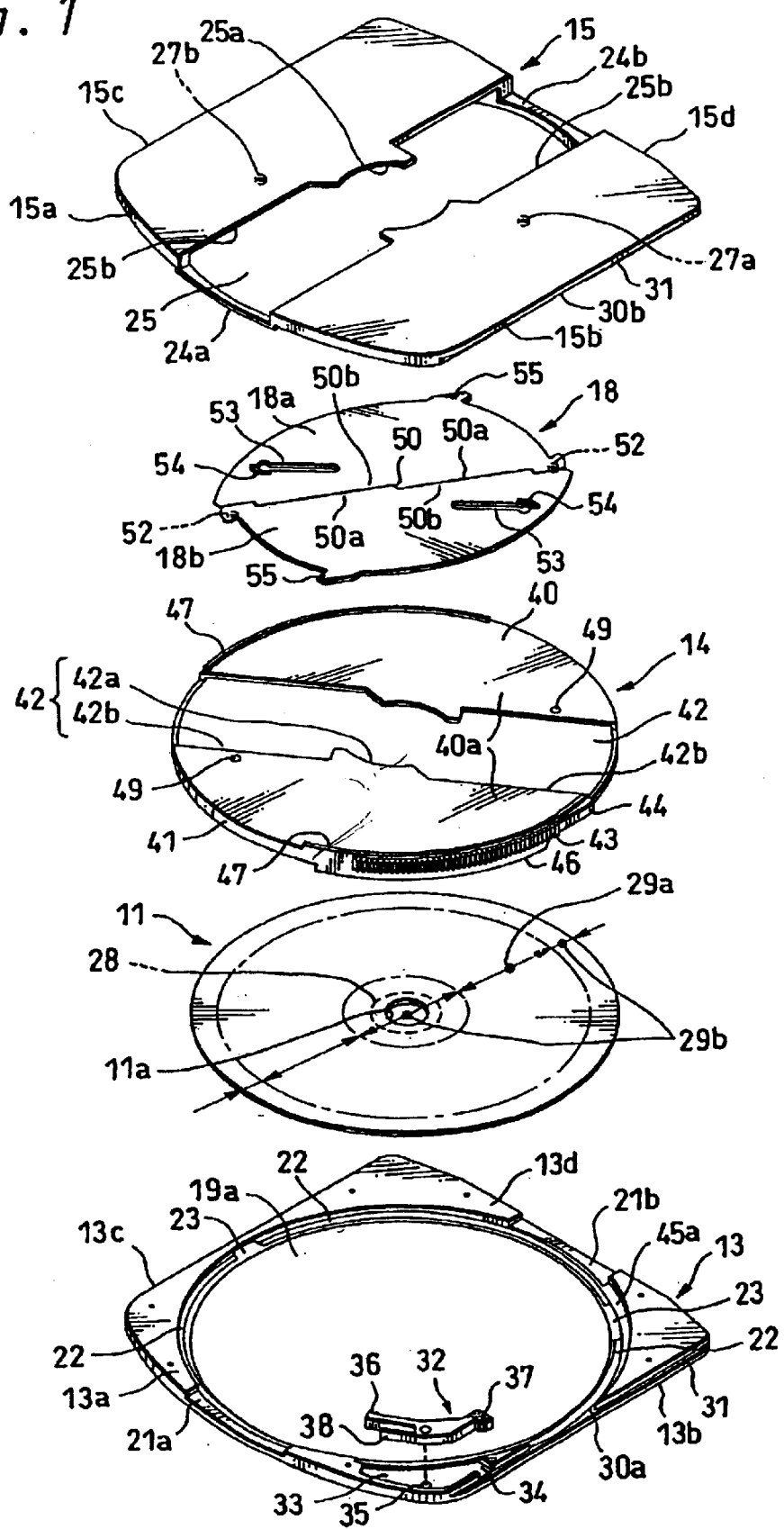
FIG. 1 is an exploded perspective view showing a disk cartridge according to a first embodiment of the present invention and illustrating the same disk cartridge from the lower surface side.
Figure 2:
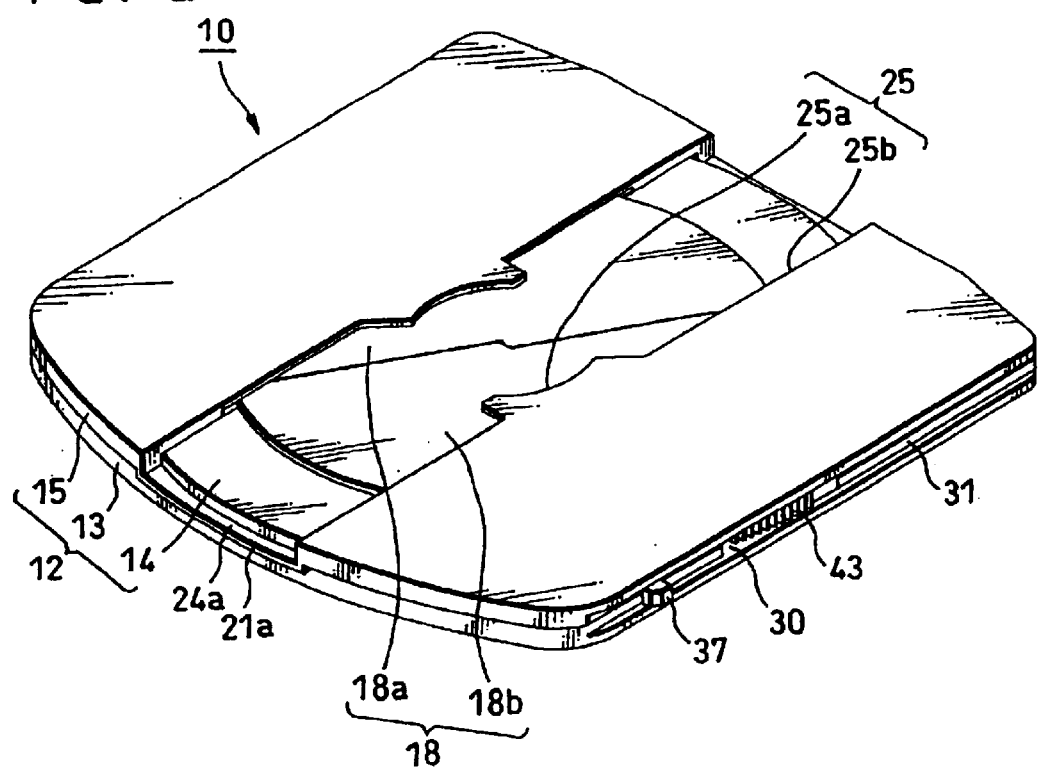
FIG. 2 is a perspective view showing the disk cartridge shown in FIG. 1 from the lower surface side and illustrating the state in which an opening portion is closed by closing a shutter mechanism.
Figure 3:
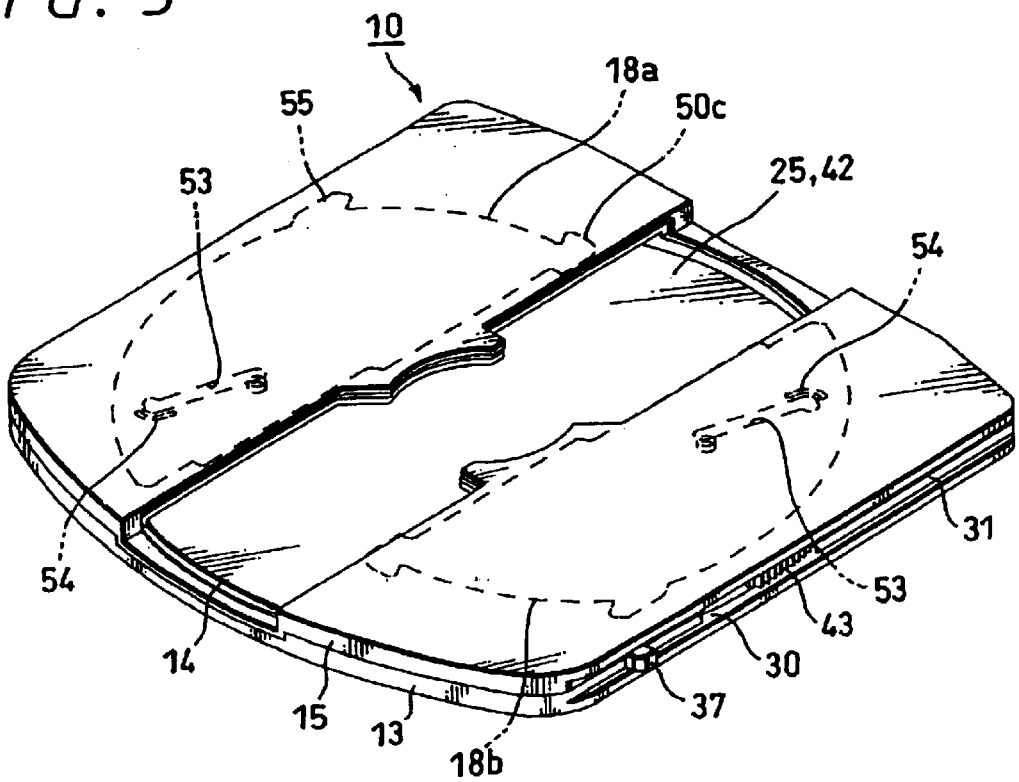
FIG. 3 is a perspective view showing the disk cartridge shown in FIG. 1 from the lower surface side and illustrating the state in which the opening portion is opened by opening the shutter mechanism.
Figure 4:
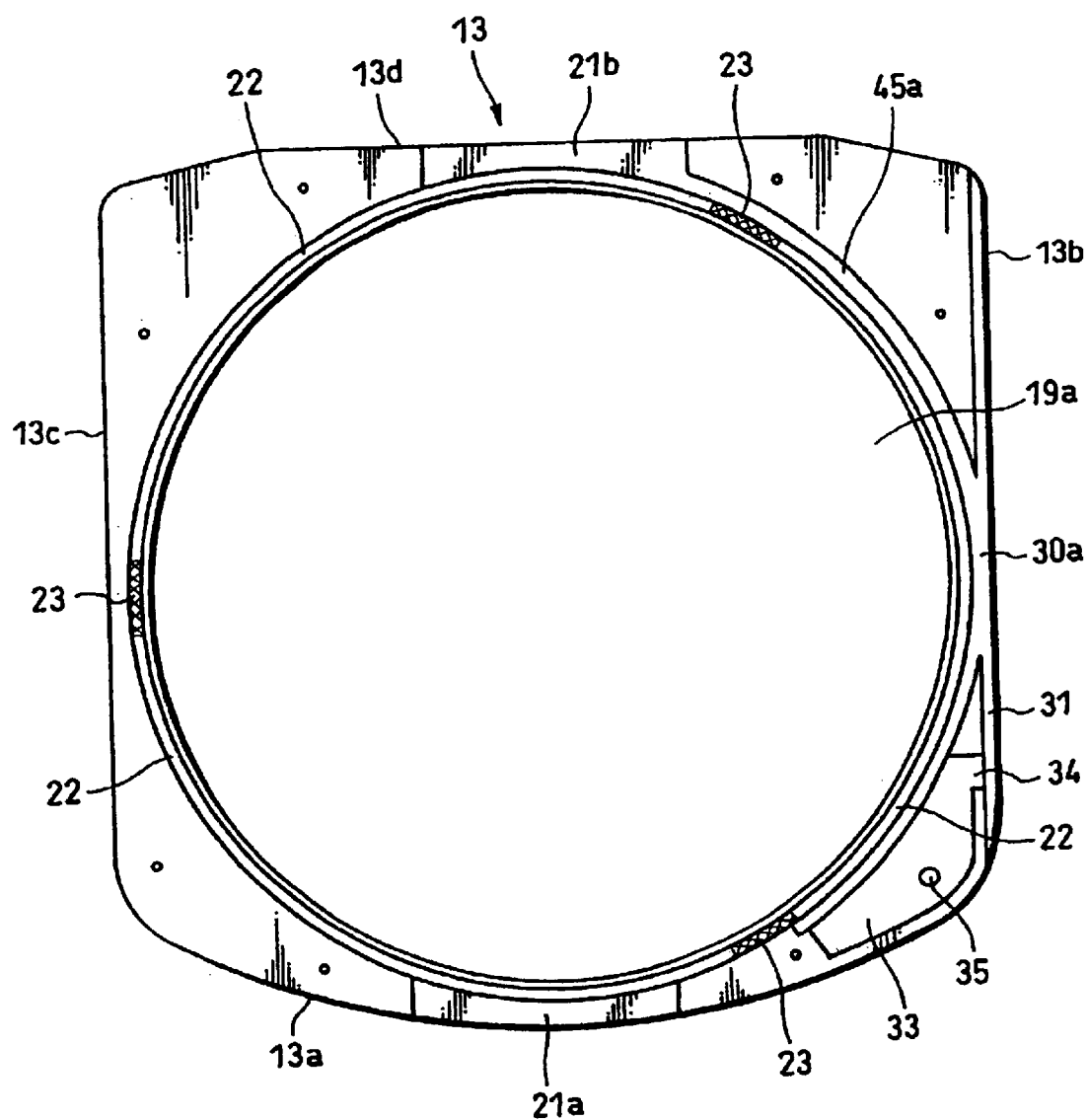
FIG. 4 is a plan view showing a lower surface of an upper shell of the disk cartridge shown in FIG. 1.
Figure 5:
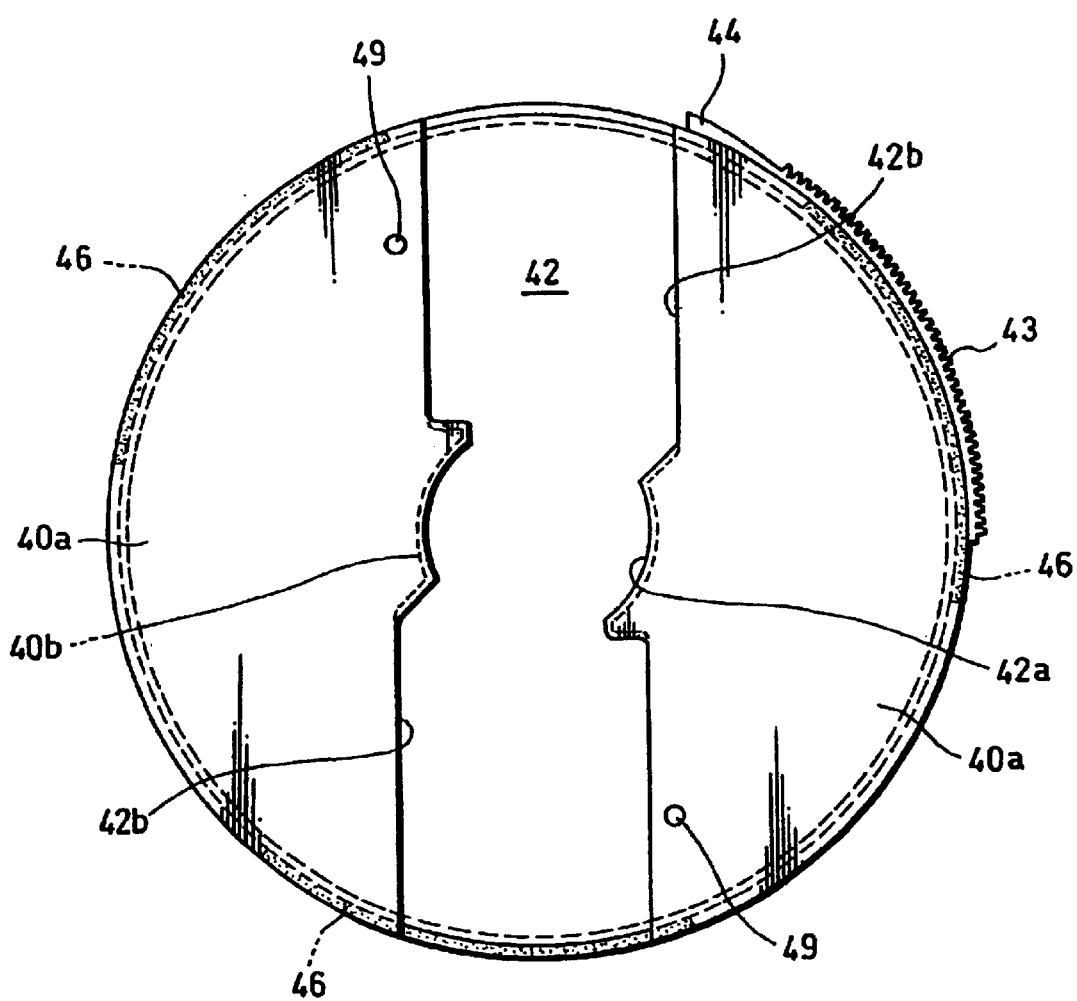
FIG. 5 is a plan view showing a lower surface of a middle shell of the disk cartridge shown in FIG. 1.
Figure 6:
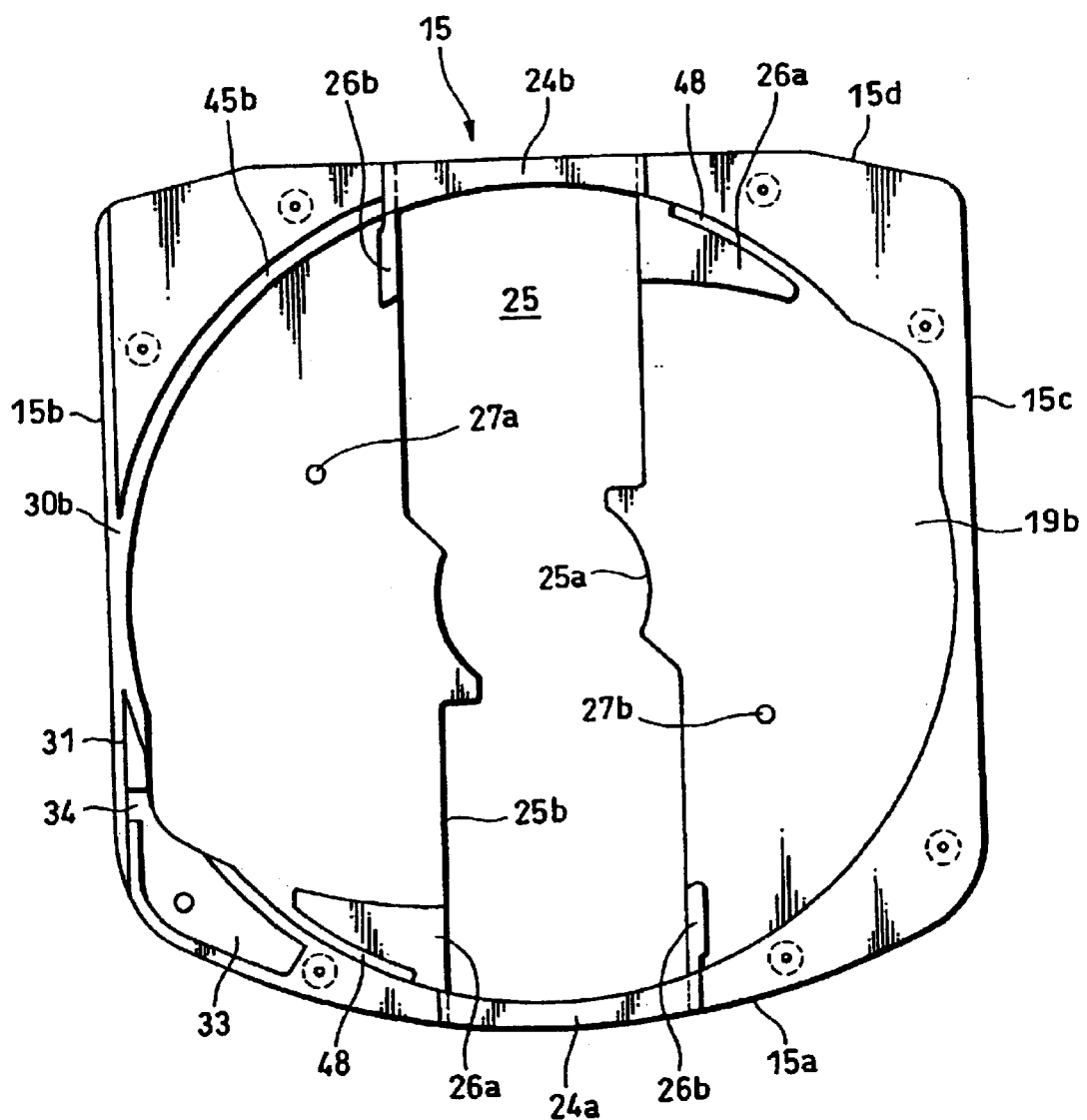
FIG. 6 is a plan view showing an upper surface of a lower shell of the disk cartridge shown in FIG. 1.
Figure 7:
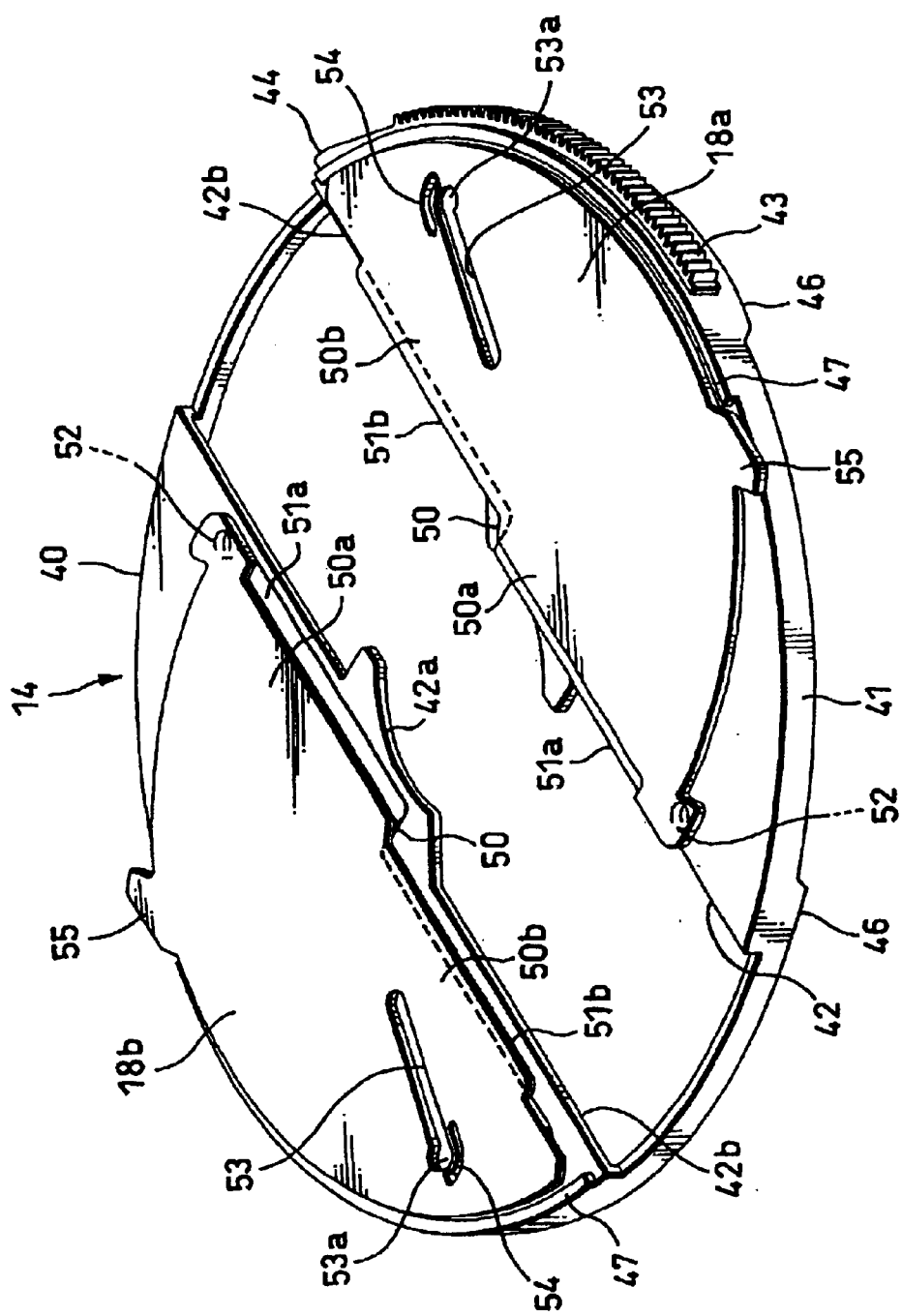
FIG. 7 is a perspective view showing the state in which an opening portion is opened by opening a pair of shutter members attached to the middle shell of the disk cartridge shown in FIG. 1.
Figure 8:
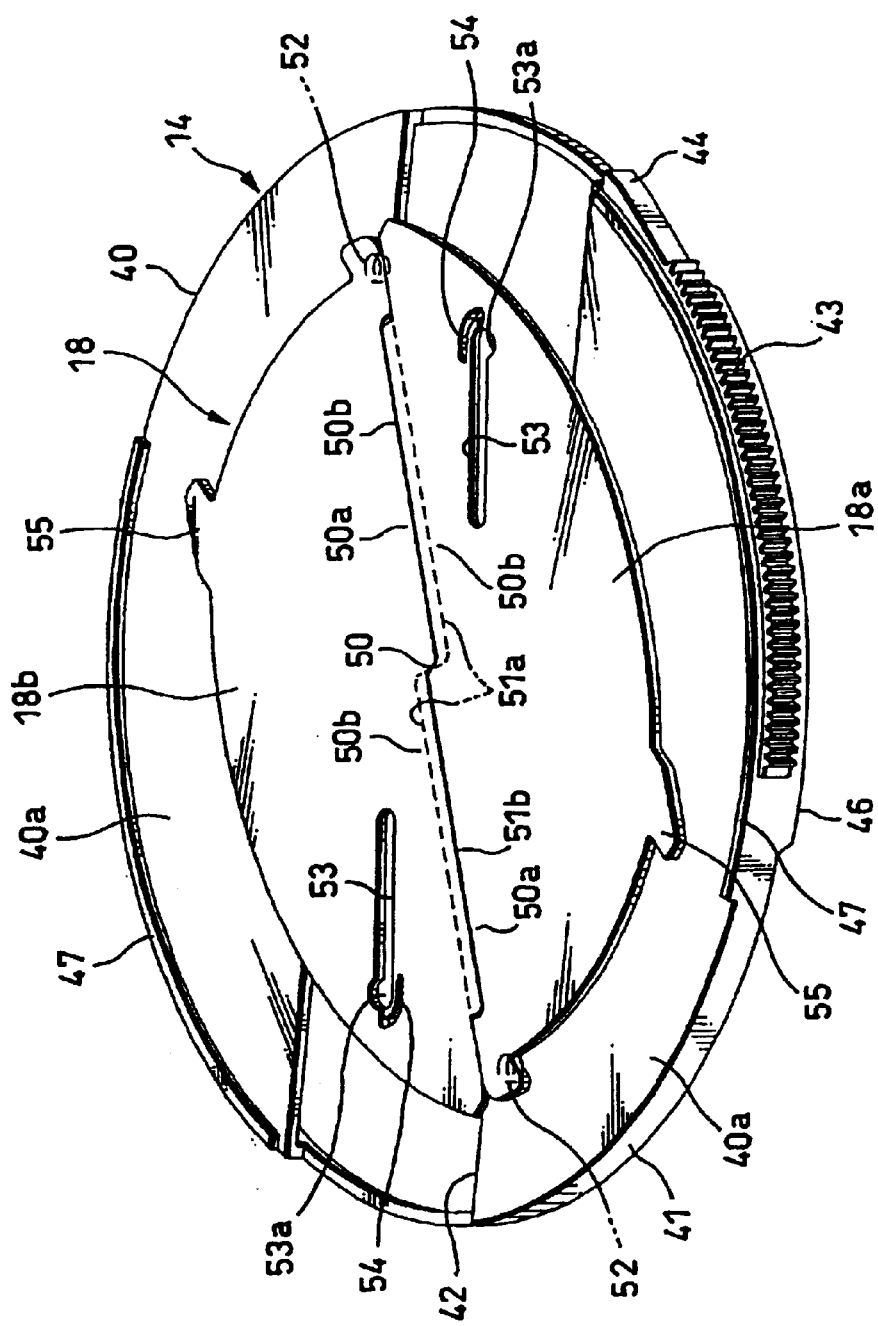
FIG. 8 is a perspective view showing the state in which the opening portion is closed by closing the pair of shutter members attached to the middle shell of the disk cartridge shown in FIG. 1.
Figure 9:
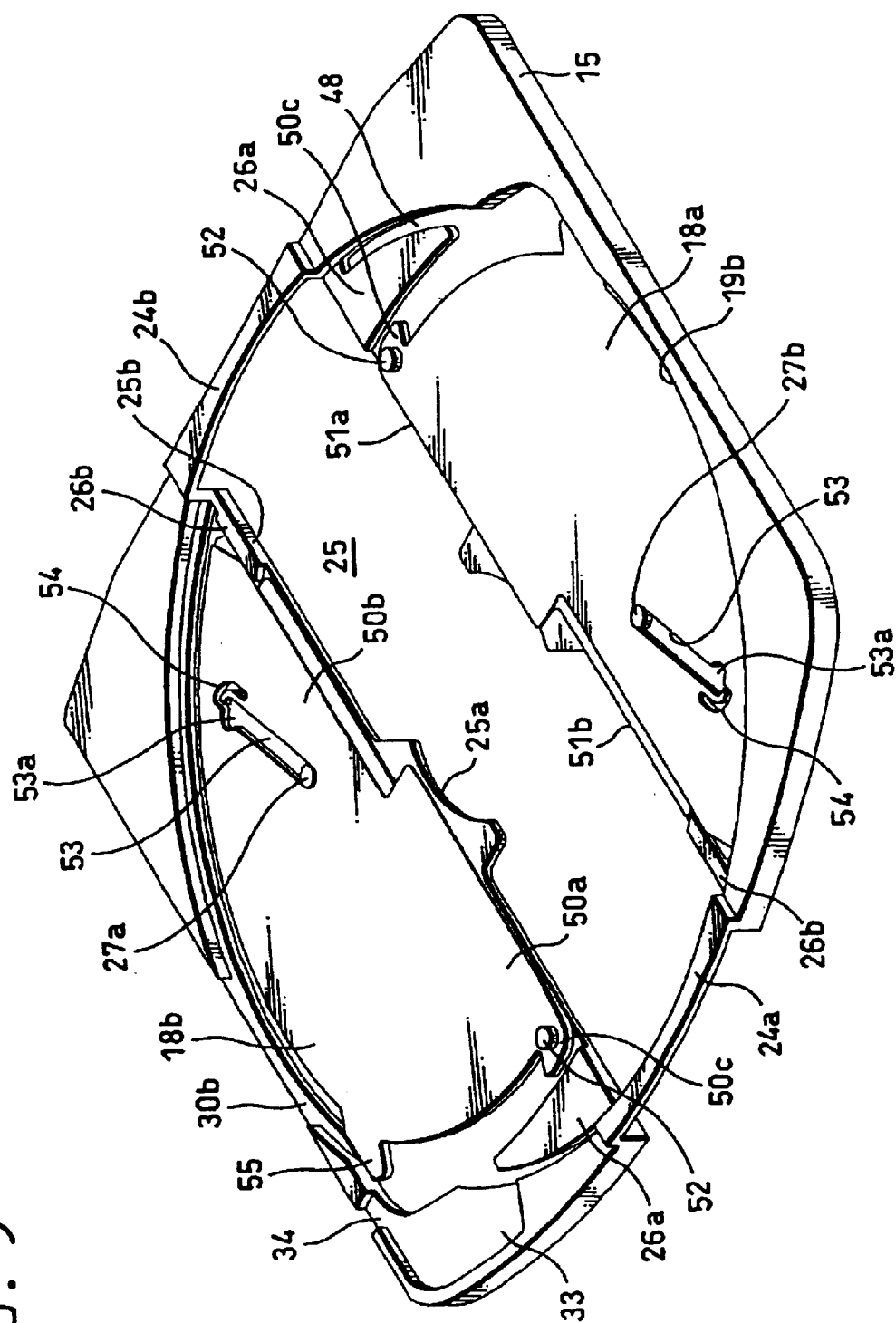
FIG. 9 is a perspective view showing the state in which a shutter mechanism is disposed on the lower shell of the disk cartridge shown in FIG. 1 and in which the opening portion is opened by opening the pair of shutter members.
Figure 10:
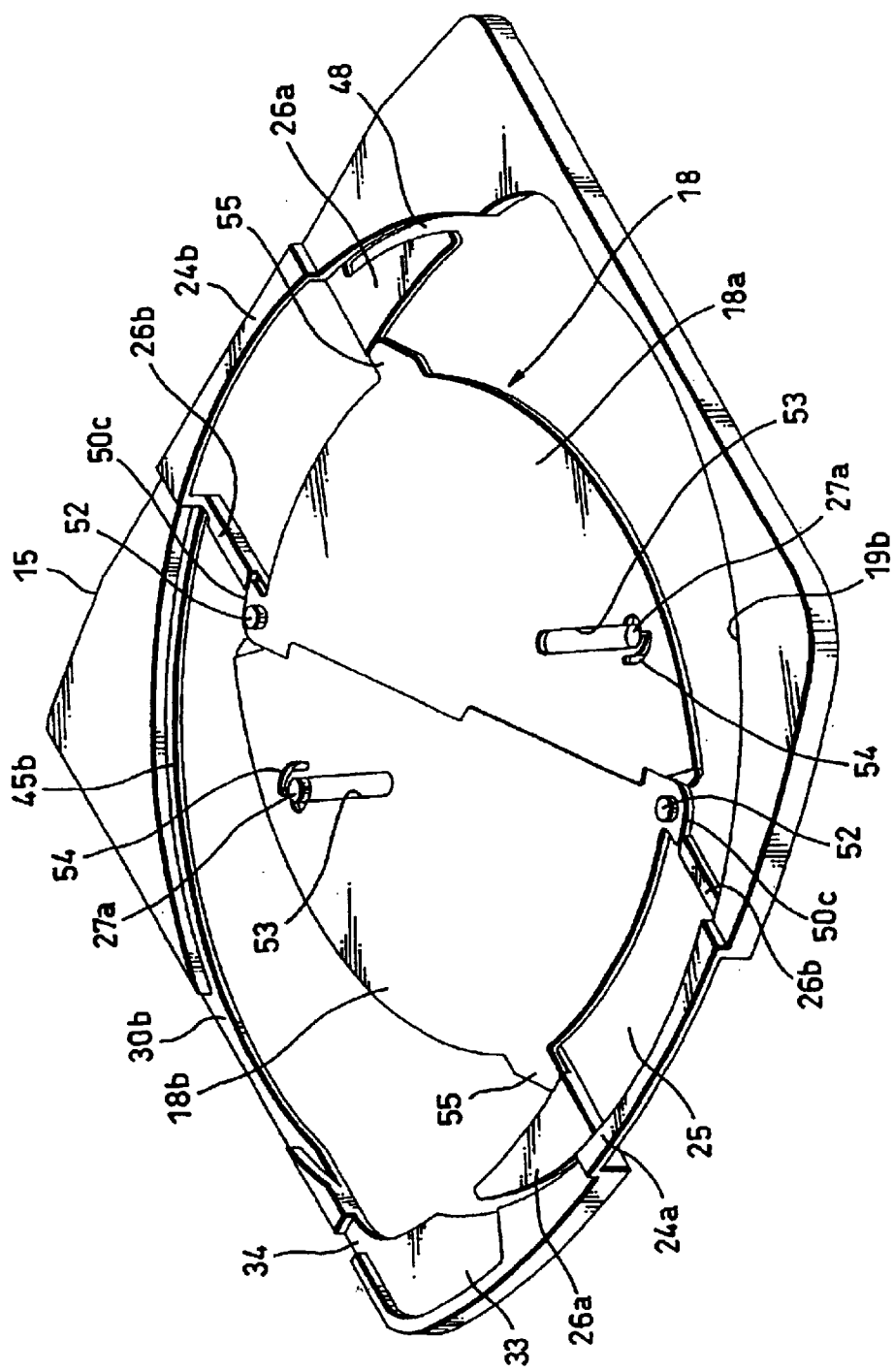
FIG. 10 is a perspective view showing the state in which the shutter mechanism is disposed on the lower shell of the disk cartridge shown in FIG. 1 and in which the opening portion is closed by closing the pair of shutter members.
Figure 11:
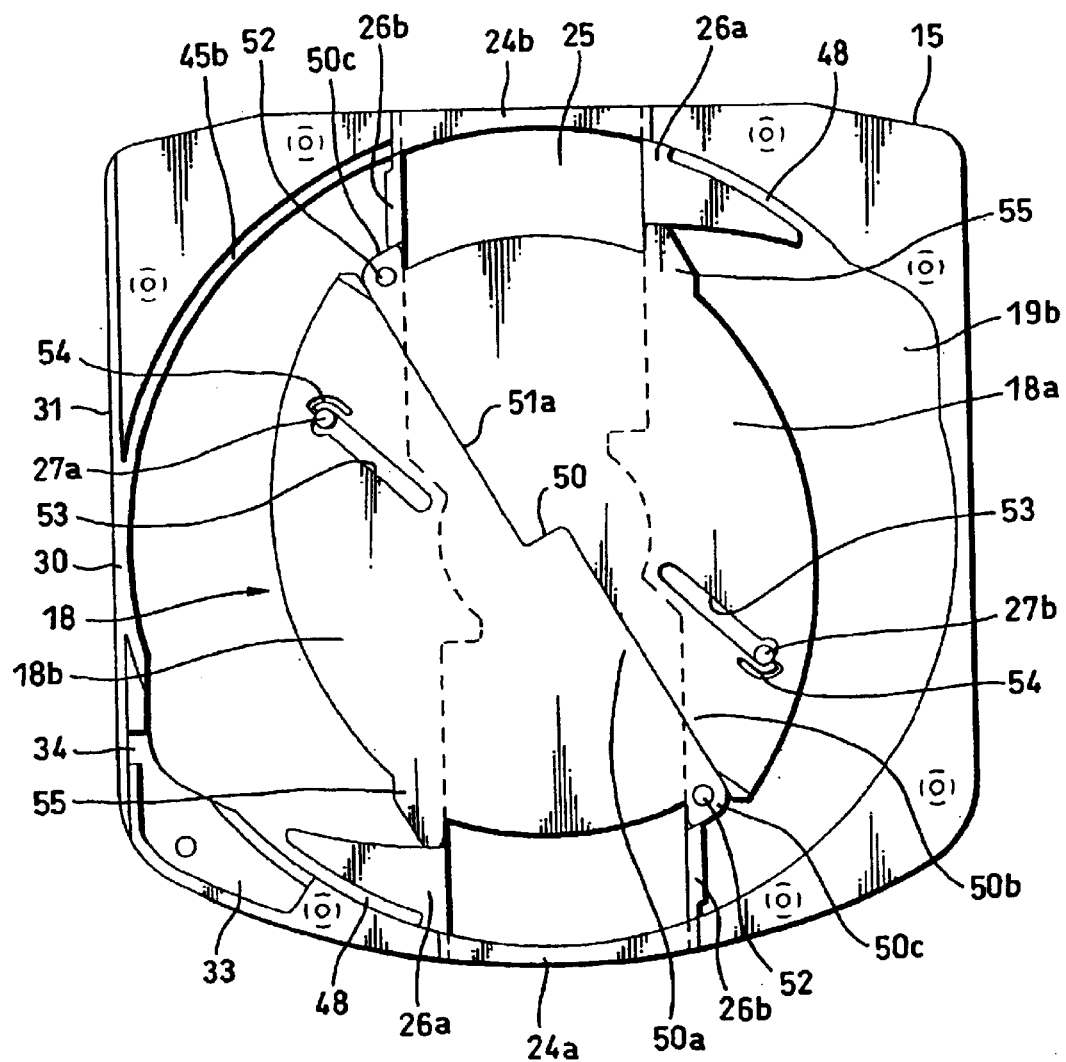
FIG. 11 is a plan view showing the disk cartridge shown in FIG. 10 from the upper direction.
Figure 12:
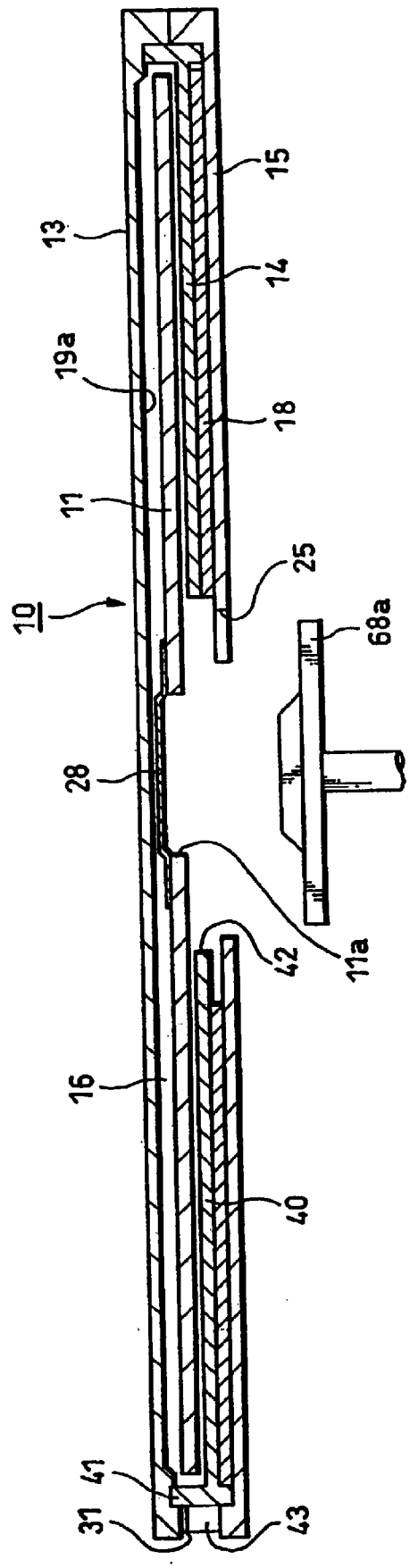
FIG. 12 is a longitudinal cross-sectional view of the central portion of the disk cartridge shown in FIG. 1 and to which reference will be made in explaining a relationship between the disk cartridge and a turntable.

Embodiments of the present invention will be described below with reference to the accompanying drawings. FIGS. 1 to 26 are diagrams showing disk cartridges according to the embodiments of the present invention. Specifically, FIG. 1 is an exploded perspective view showing a disk cartridge according to a first embodiment from a lower shell side. FIG. 2 is a perspective view showing the same disk cartridge with its shutter being closed from the lower shell side. FIG. 3 is a perspective view showing the same disk cartridge with its shutter being opened. FIG. 4 is a bottom view of an upper shell. FIG. 5 is bottom view of a middle shell. FIG. 6 is a plan view of the lower shell. FIG. 7 is a perspective view showing the middle shell and a pair of shutter members being opened. FIG. 8 is a perspective view showing the state in which the pair of shutter members shown in FIG. 7 are being opened. FIG. 9 is a perspective view showing the lower shell and the pair of shutter members being opened. FIG. 10 is a perspective view showing the state in which the pair of shutter members shown in FIG. 9 are being closed. FIG. 11A is a plan view of FIG. 10. FIG. 12 is an explanatory diagram showing the central portion in cross-section.

Figure 19:
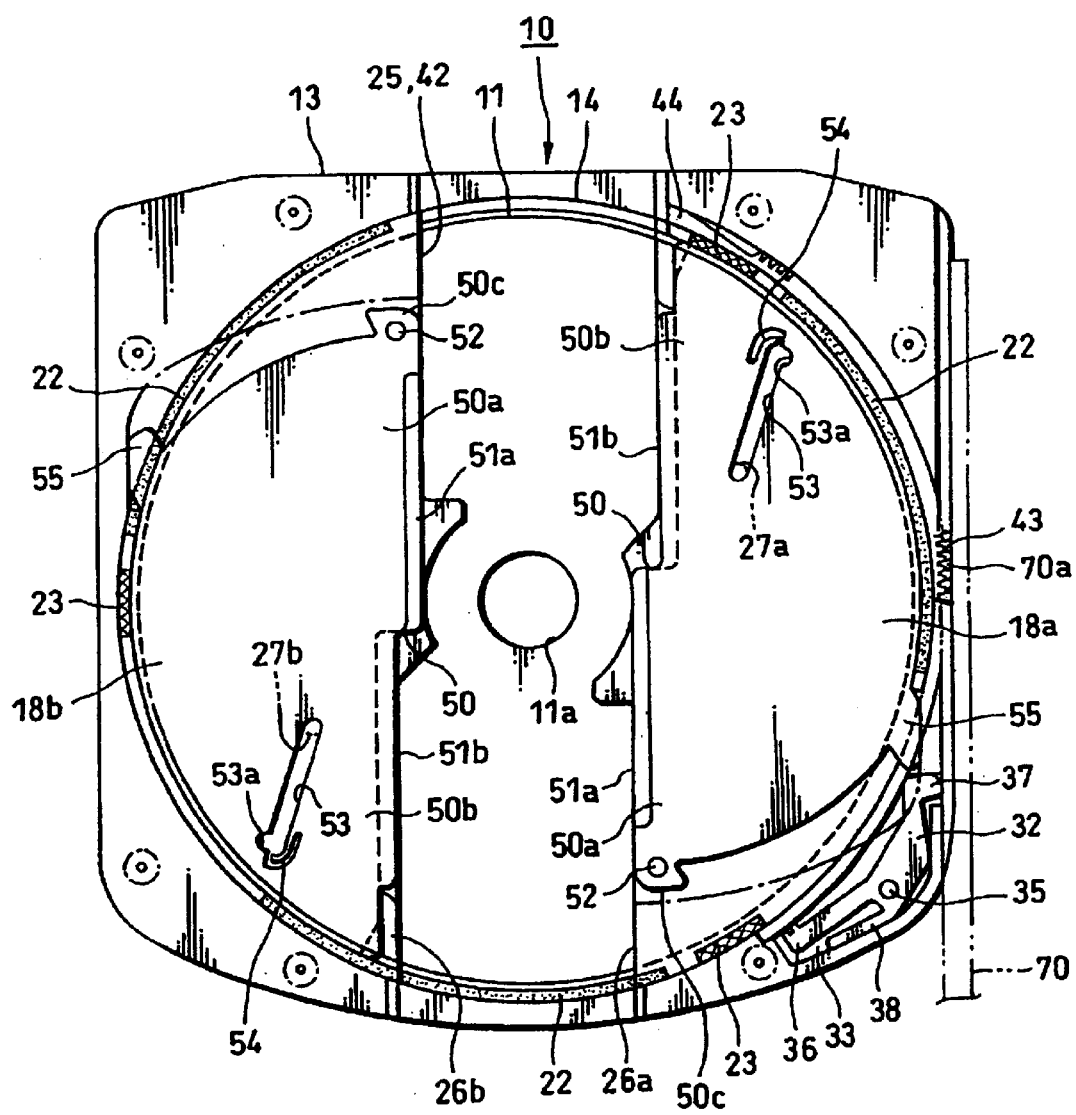
FIG. 19 is an explanatory diagram showing the state in which the middle shell is yet further rotated so that the pair of shutter members are opened completely.
Figure 20A:
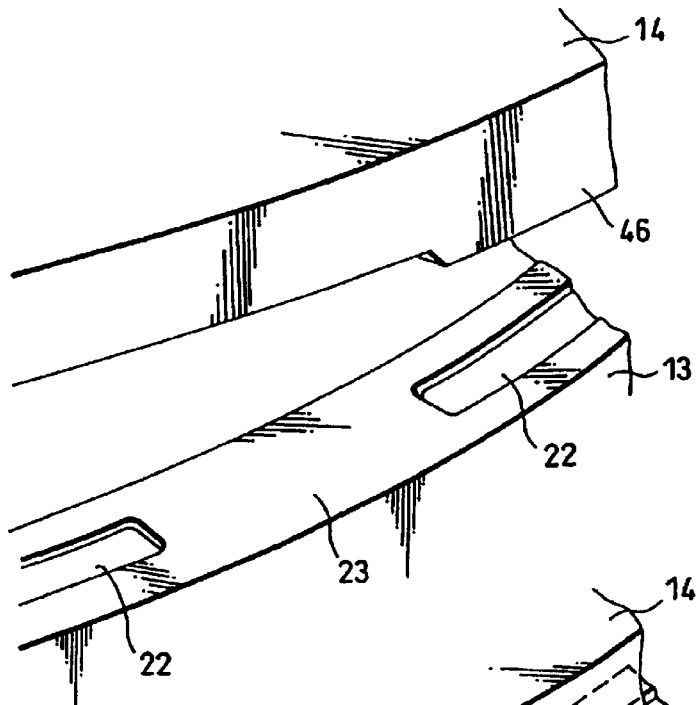
FIG. 20A is an exploded perspective view.
Figure 20B:
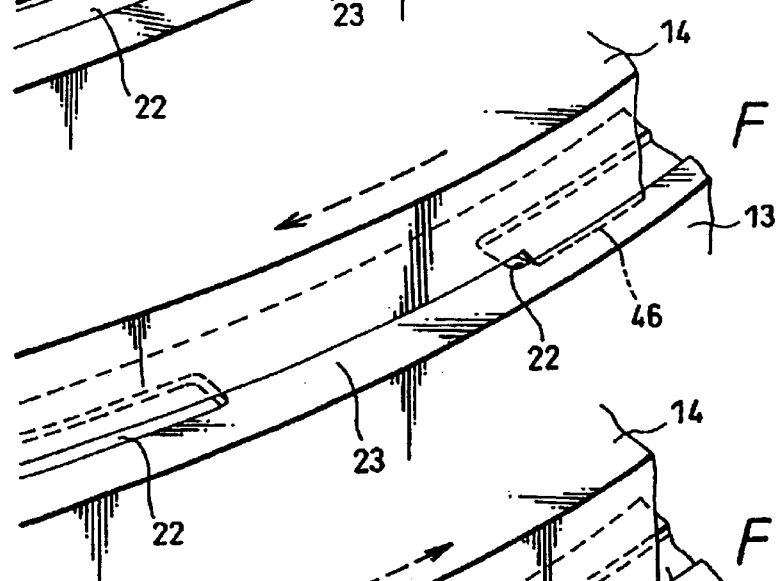
FIG. 20B is a perspective view showing the state in which the middle shell is descended and FIG. 20C is a perspective view showing the state in which the middle shell is ascended.
Figure 20C:
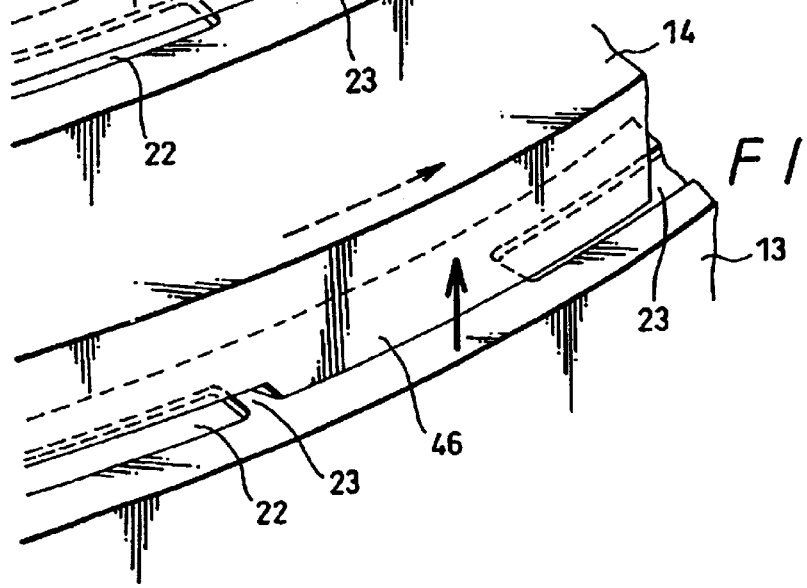
Figure 22:
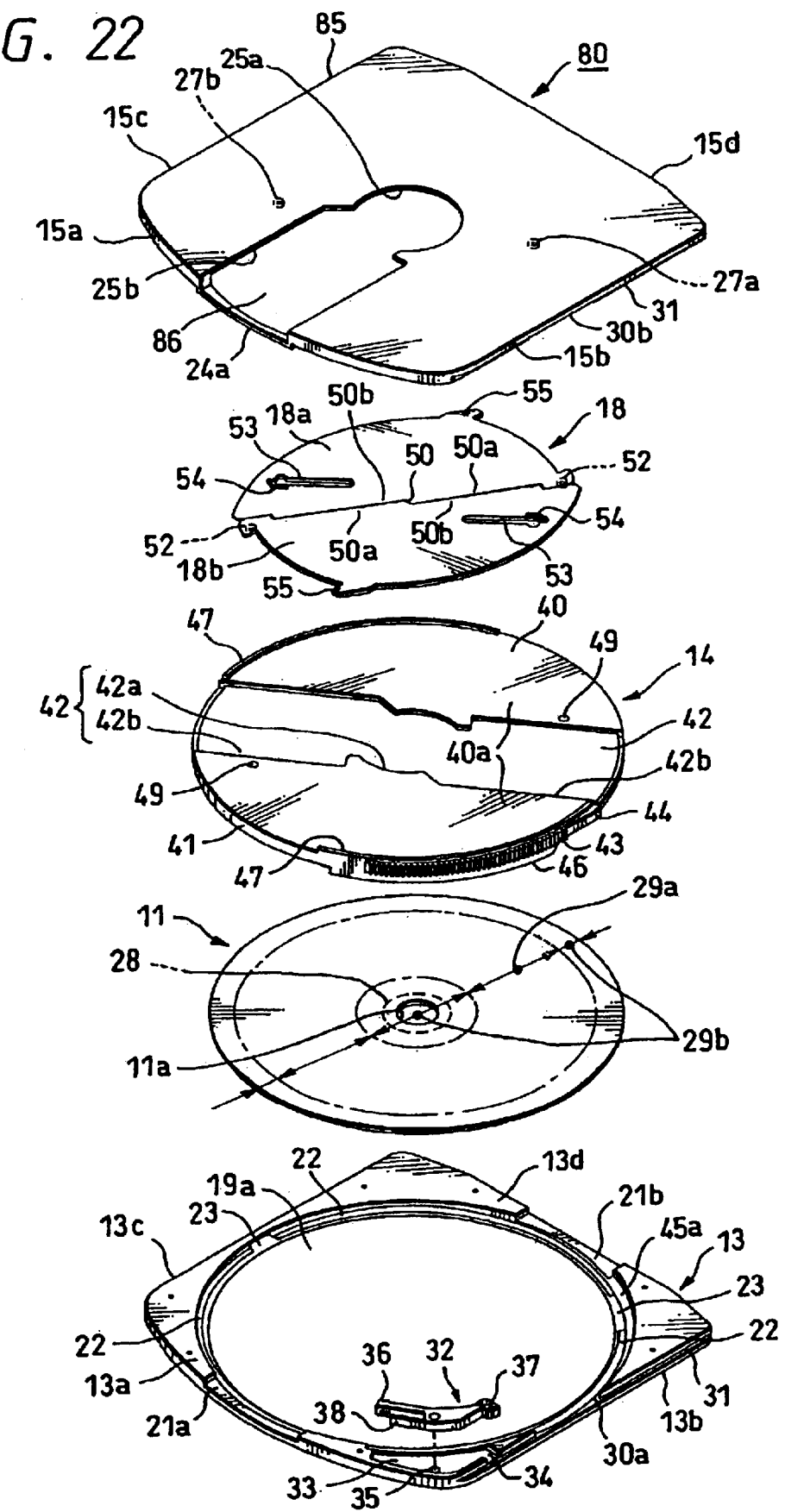
FIG. 22 is an exploded perspective view showing a disk cartridge according to a second embodiment of the present invention and illustrating the disk cartridge from the lower surface side.
Figure 23:
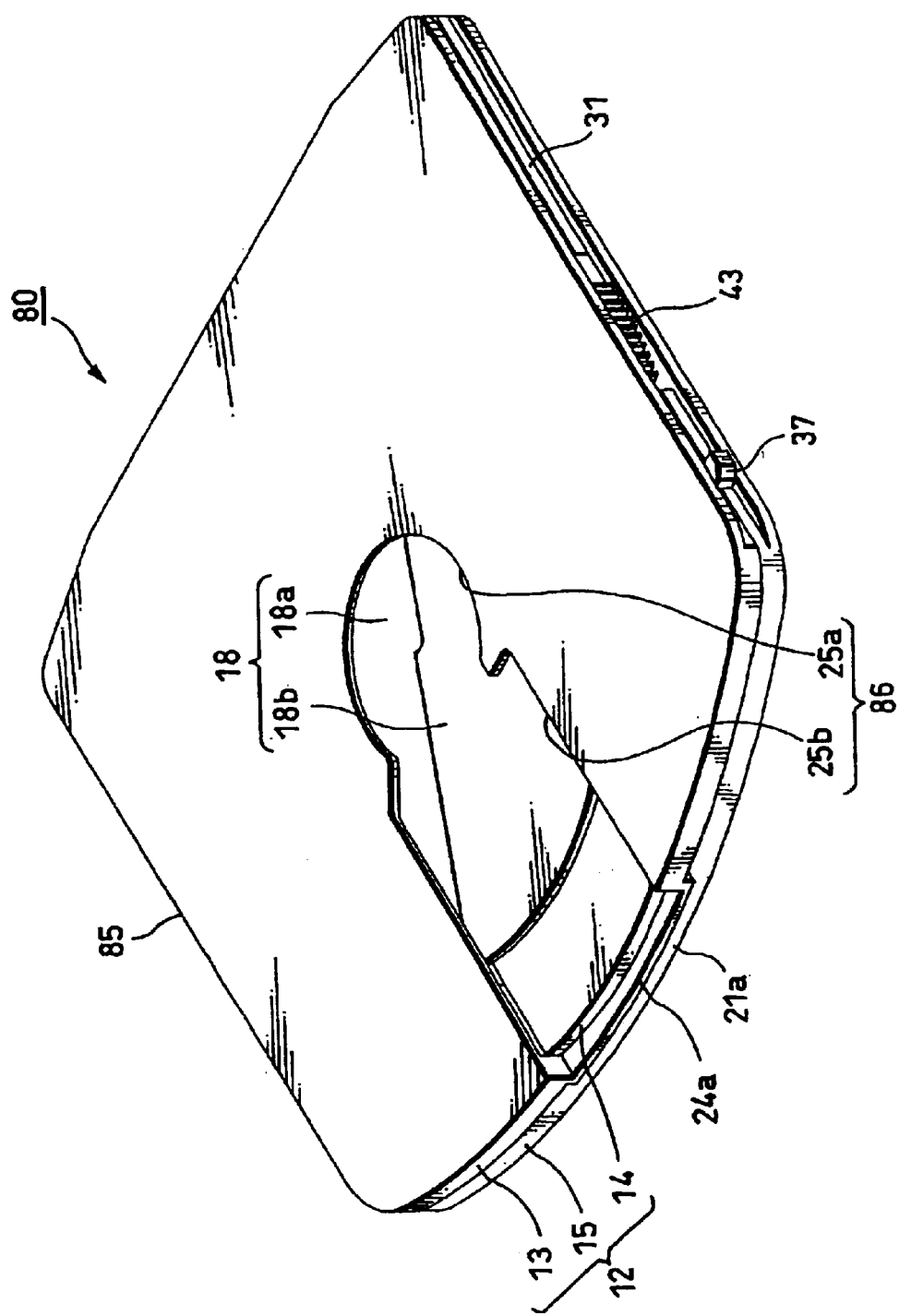
FIG. 23 is a perspective view showing the disk cartridge shown in FIG. 22 from the lower surface side and illustrating the state in which the opening portion is closed by closing the shutter mechanism.
Figure 24:
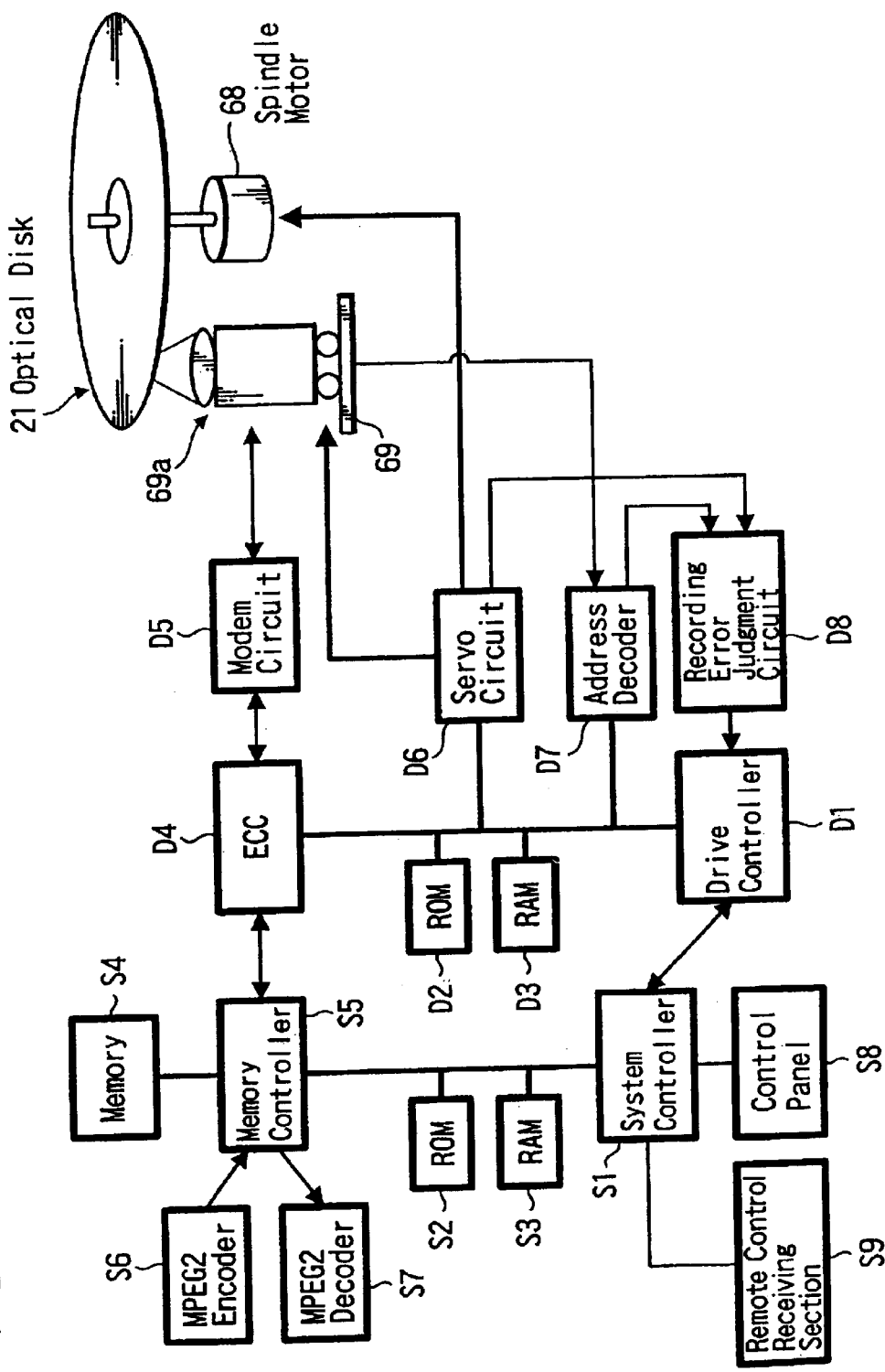
FIG. 24 is a block diagram to which reference will be made in explaining a circuit arrangement of a disk recording and reproducing apparatus which uses the disk cartridge according to the present invention.
Figure 25:
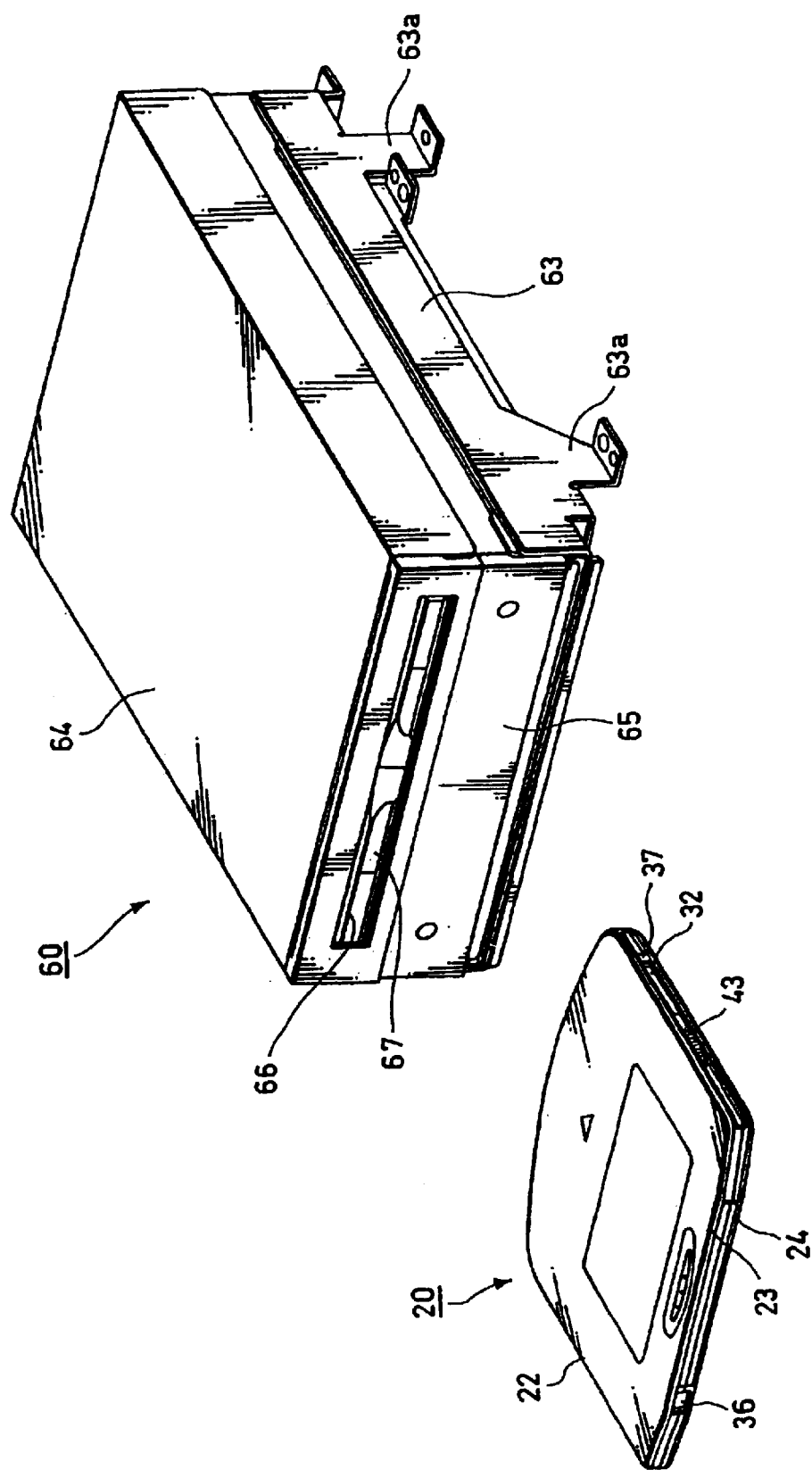
FIG. 25 is a perspective view showing the state presented before the disk cartridge shown in FIG. 1 is inserted into the disk recording and reproducing apparatus which uses the disk cartridge according to the present invention.
Figure 26:
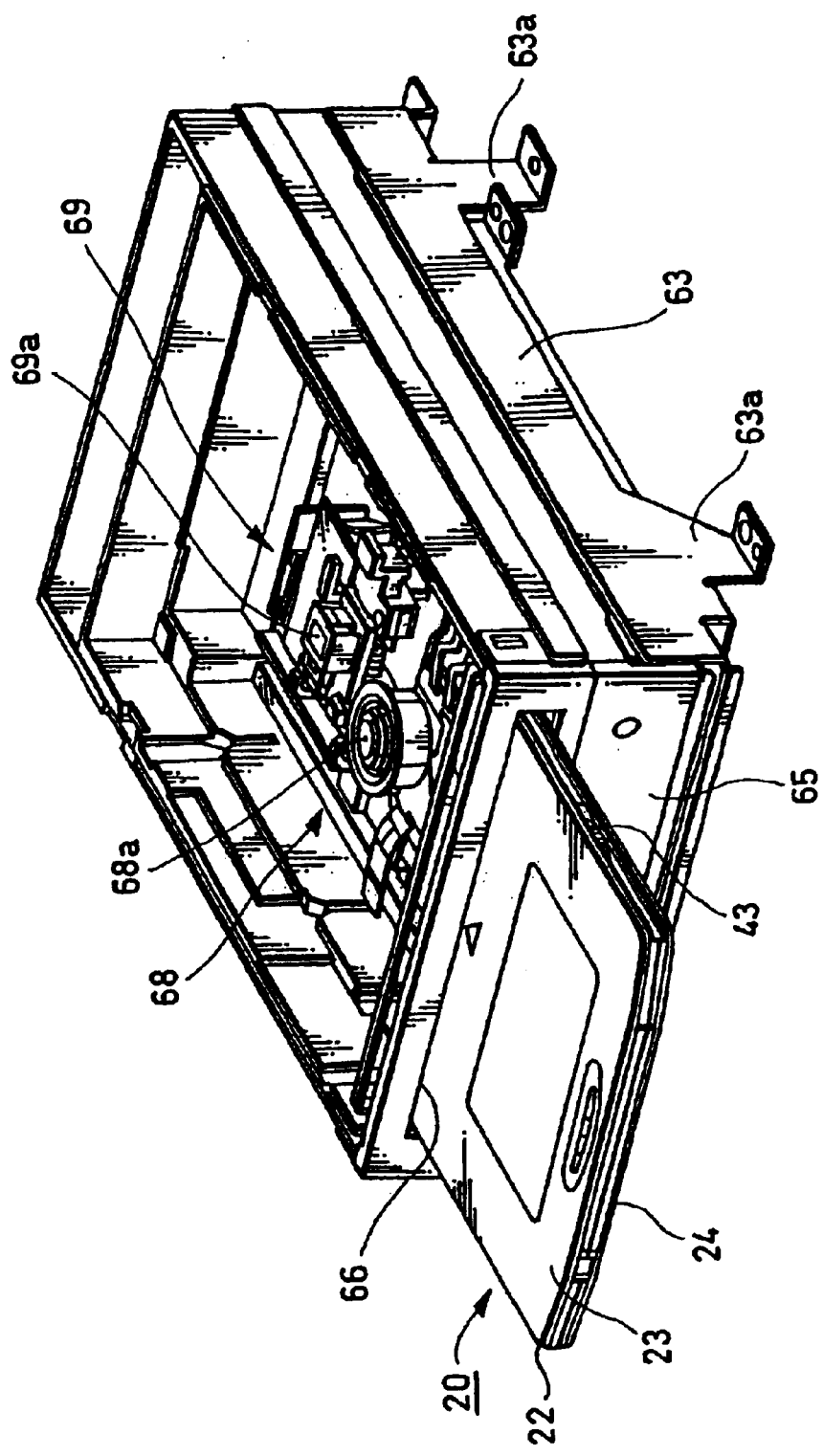
FIG. 26 is a perspective view showing the state in which the disk cartridge shown in FIG. 1 is being inserted into the disk recording and reproducing apparatus which uses the disk cartridge according to the present invention.
Figure 27:
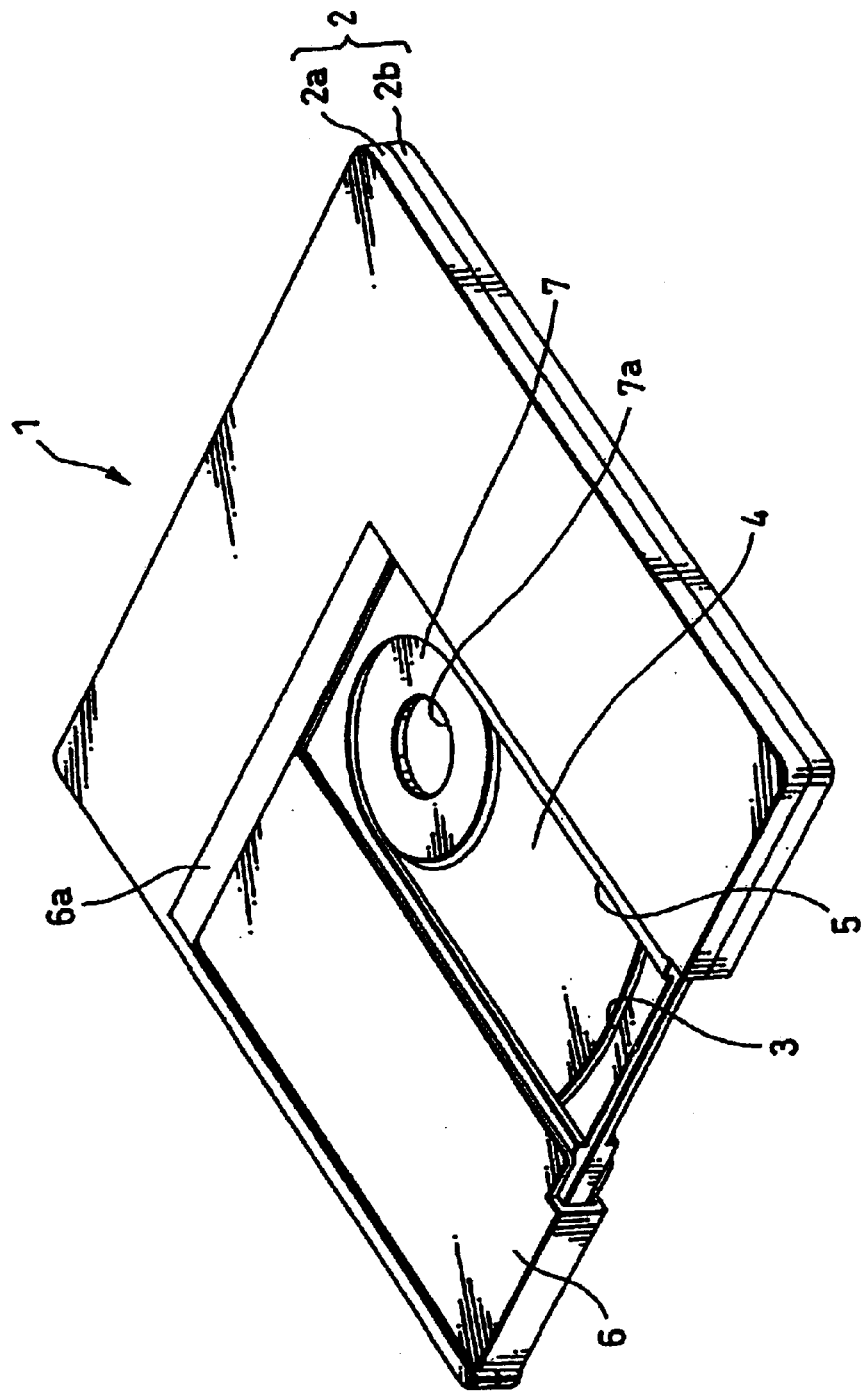
FIG. 27 is a perspective view showing a conventional disk cartridge.

FIGS. 13 to 19 are explanatory diagrams showing a relationship between the rotation amount of the middle shell and the opened and closed states of the pair of shutter members, respectively. FIGS. 20A to 20C are explanatory diagrams showing a relationship between the rotation of the middle shell and the ascending and descending operations, respectively. FIGS. 21A and 21B are explanatory diagrams showing the state in which the shutter members are closely contacted/released based on the ascending and descending operations executed when the middle shell is rotated. FIG. 22 is an exploded perspective view showing a disk cartridge according to a second embodiment from a lower shell side. FIG. 23 is a perspective view showing the same disk cartridge from the lower shell side with the shutter closed. FIG. 24 is a block diagram to which reference will be made in explaining a circuit arrangement of an information disk recording and reproducing apparatus which can use the inventive disk cartridge according to an embodiment of the present invention. FIG. 25 is a perspective view showing the state presented before the disk cartridge according to the present invention is inserted into the disk recording and reproducing apparatus. FIG. 26 is a perspective view showing the state in which the disk cartridge is being inserted into the same disk recording and reproducing apparatus.

A disk cartridge 10 according to the first embodiment stores therein a read-only optical disk on which various information signals such as a music signal serving as audio information and a video signal and a music signal, both serving as video information, are recorded in advance or an optical disk (write once optical disk) on which an information signal such as audio information and video information can be recorded only once or an optical disk (rewritable optical disk) 11 on which an information signal can be recorded many times repeatedly as a disk-like recording medium. However, the disk-like recording medium is not limited to the above optical disks, and a magnetic disk in which information can be memorized by magnetic status of a specific position on a magnetic thin layer formed on the surface of a thin disk, a magnetooptical disk in which information can be written in and read out from the magnetic thin layer formed similarly by using an optical head and a magnetic head and other storage mediums can be applied as the above disk-like recording medium.

As shown in FIGS. 1 to 3, this disk cartridge 10 comprises a cartridge housing 12 formed by overlapping a pair of an upper shell 13, a middle shell 14 and a lower shell 15, an optical disk 11 stored within a disk compartment 16 formed within this cartridge housing 12 so as to become freely rotatable, a pair of shutter members 18a, 18b for opening and closing opening portions 25, 42 bored through the middle shell 14 and the lower shell 15, and the like. In this disk cartridge 10, when the optical disk 11 is in use in the horizontal direction, the upper shell 13 is normally disposed on the upper side. However, for convenience sake of explanation, the upper side and the lower side are reversed in FIG. 1, and hence the upper shell 13 is placed in the lower side.

The upper shell 13 is a thin disk-like member of substantially a square-shape the front side of which is shaped as a circular arc as shown in FIGS. 1 and 4. At the central portion of the lower surface (surface in FIG. 1) of this upper shell 13, there is provided a circular upper concave portion 19a into which substantially an upper half of the middle shell 14 in the thickness direction can be fitted rotatably. When the upper concave portion 19a is provided on the central portion of the lower surface, a front edge portion 13a, left and right side edge portions 13b, 13c and a rear edge portion 13d are formed on the outer peripheral edge of the upper shell 13. At substantially the central portions of the front edge portion 13a and the rear edge portion 13d of the upper shell 13, there are provided positioning concave portions 21a and 21b which are used to properly position the upper shell relative to the lower shell 15.

On the outer peripheral edge of the upper concave portion 19a of the upper shell 13, there are provided three circular-arc-like cam grooves 22, each having a predetermined length, which are continued along the circumferential direction. Then, there are provided the three cam grooves 22, whereby three lift up portions 23 (shown hatched in FIG. 4), each having a predetermined length, between the adjacent cam grooves 22 and 22. A cam portion 46 provided in the middle shell 14 is slidably fitted into the three cam grooves 22.

The lower shell 15 is overlapped to the lower surface of the upper shell 13. As shown in FIGS. 1 and 6, the lower shell 15 has an outward appearance shape which is substantially similar to that of the upper shell 13 and is formed of a substantially square thin disk-like member whose front side is shaped as a circular arc. On the central portion of the flat surface (surface hidden as the back in FIG. 1) of this lower shell 15, there is provided a circular lower concave portion 19b into which a substantially lower half portion of the thickness direction of the middle shell 14 is fitted rotatably. When this lower concave portion 19b is provided on the central portion of the flat surface of the lower shell, a front edge portion 15a, left and right side edge portion 15b, 15c and a rear edge portion 15d are provided on the outer peripheral edge of the lower shell 15. On substantially a central portion between the front edge portion 15a and the rear edge portion 15d of the lower shell 15, there are provided positioning convex portions 24a and 24b which are used to properly position the lower shell relative to the upper shell 13.

The convex portions 24a, 24b of the lower shell 15 are respectively engaged with the concave portions 21a, 21b of the upper shell 13, whereby the upper and lower shells 13, 15 are properly positioned and overlapped together in a predetermined state. The middle shell 14 is stored within a circular space formed of the upper and lower concave portions 19a, 19b formed within the upper and lower shells 13, 15 so as to become freely rotatable. An opening portion 25 extended in the front and back direction is bored at the central portion of the lower shell 15. This opening portion 25 is used to allow a turntable of a disk rotary drive mechanism and an optical head of an optical pickup device to face to the optical disk 11 and is set to be wide enough so that they can be inserted into and ejected from the opening portion.

Specifically, the opening portion 25 of the lower shell 15 includes a table opening portion 25a set at the central portion into and from which the turntable is inserted and ejected and a head opening portion 25b extended in the front and back direction of the table opening portion 25a. The shape of this opening portion 25 is considered such that each of two optical heads can be simultaneously inserted into and ejected from both sides of the table opening portion 25a in the head opening portion 25b respectively. On the inner surfaces of both ends of the front and back direction of the head opening portion 25b, there are respectively provided cover portions 26a, 26b which are used to close the spacing between them and shutter members 18a, 18b which will be described later on. Further, within the lower concave portion 19b, there are provided a pair of operation convex portions 27a, 27b which become symmetrical with respect to the table opening portion 25a.

The middle shell 14 is stored within the upper and lower concave portions 19a, 19b formed by the upper shell 13 and the lower shell 15 having the above arrangements, and the middle shell 14 and the upper shell 13 constitute a disk compartment 16 formed of a circular spacing portion. Within this disk compartment 16, there is stored the optical disk 11 with a predetermined spacing in the outside of the radius direction and in the thickness direction. This optical disk 11 is formed of a thin disk-like recording member having a center hole 11a bored at the central portion.

To one surface of the central portion of this optical disk 11, there is fixed a center hub 28 so as to cover the center hole 11a by a fixing means such as an adhesive agent. This center hub 28 is formed of a magnetic material such as an iron plate attracted by a magnet. A turntable of a disk rotary drive apparatus incorporated within a disk recording and reproducing apparatus is fitted through the center hole 11a to the center hub 28. The center hub 28 is attracted by magnet force of a magnet provided on the turntable. Consequently, the optical disk 11 is chucked to the turntable and integrated in the rotation direction, whereby the optical disk is rotated at a predetermined velocity (e.g., at a constant linear velocity) by driving a spindle motor to which the turntable is attached.

On one surface of this optical disk 11, there are provided an information recording area 29a on which information can be recorded and which is opposed by an optical head of an optical pickup device incorporated within the disk recording and reproducing apparatus and a non-recording area 29b on which information cannot be recorded. The non-recording area 29b is comprised of an inner non-recording area 29b having a predetermined width provided on the outside of the center hub 23 which is in the inside of the optical disk 11 and an outer non-recording area 29b having a predetermined width provided on the outer peripheral edge of the optical disk 11. An information recording area 29a is provided between the inner and outer non-recording areas 29b and 29b. As a material of a substrate of this optical disk 11, synthetic resins such as polycarbonate (PC) and polyolefin should be suitably used. It is needless to say that other synthetic resins can be used and that materials are not limited to the synthetic resins and that various materials such as a glass material and an aluminum alloy which can be used as an information recording medium may be used.

An opening window 30 is bored at substantially central portions of one side edge portions 13b, 15b of the upper and lower shells 13, 15 so as to expose a part of the outer peripheral surface of the middle shell 14. This opening window 30 is comprised of an upper recess portion 30a provided on the joint portion of the upper shell 13 and a lower recess portion 30b provided on the joint portion of the lower shell 15. Further, on one side edge portions 13b, 15b of the upper and lower shells 13, 15, there is provided a guide groove 31 which is extended along the joint surface in the front and back direction. This guide groove 31 is provided in order to prevent a mis-insertion from being carried out when the disk cartridge 10 is loaded onto the disk recording and reproducing apparatus. The opening window 30 is communicated with the guide groove 31.

On the front corner portions of one side edge portions 13b, 15b of the upper and lower shells 13, 15, there is provided a lock storing portion 33 in which a lock member 32 can be stored rotatably. This lock storing portion 33 is communicated with the concave portions 19a, 19b and is communicated with the guide groove 31 through an opening hole 34 bored through one side edge portions 13b, 15b. Further, on the lock storing portion 33 of the upper shell 13, there is provided a support shaft 35 which rotatably supports the lock member 32 in such a manner that it may be protruded from the lower shell 15 side.

Figure 13:
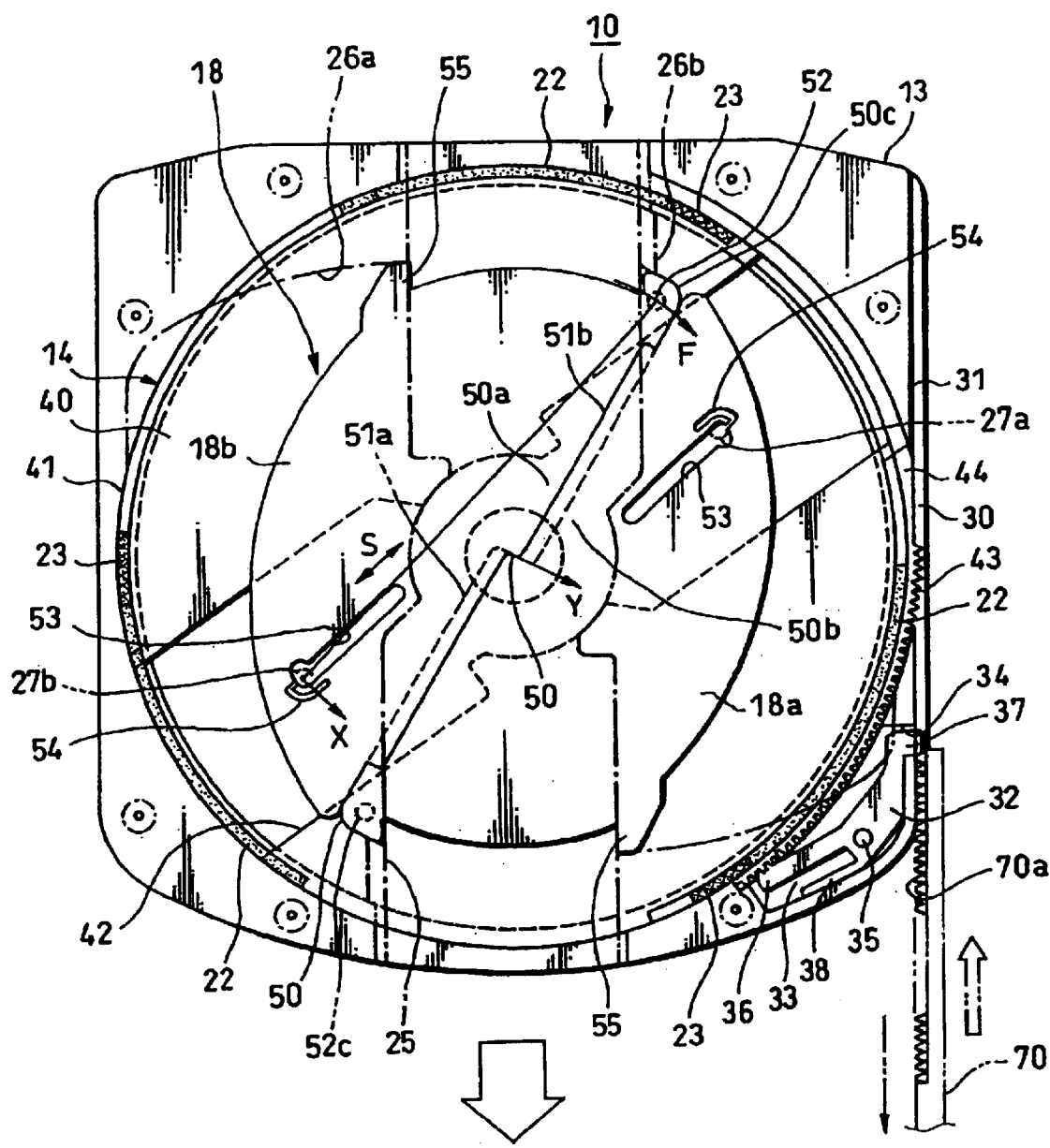
FIG. 13 is an explanatory diagram showing a relationship between operations of a cartridge housing and a shutter mechanism of the disk cartridge shown in FIG. 1 and illustrating the state in which the opening portion is completely closed by closing the pair of shutter members.

This lock member 32 is formed of a lever-like member which is rotatably fitted into a supporting shaft 35 in such a manner that it can be swung in the plane direction as shown in FIGS. 1 and 13. A stopper portion 36 having a plurality of teeth is provided at the lock member 32 at its one end and an input portion 37 is provided at the other end in the longitudinal direction. Further, the lock member 32 has a spring piece 38 integrally formed therewith and which is protruded in the same direction so as to oppose to the stopper portion 36.

The lock member 32 having the above arrangement is fitted into the supporting shaft 35 under the condition that the stopper portion 36 is faced toward the concave portions 19a, 19b side. The spring piece 38 is brought in contact with the inner surfaces of the front edge portions 13a, 15a. Under spring force of this spring member 38, the stopper portion 36 is spring-biased toward the concave portions 19a, 19b side. Concurrently therewith, the input portion 37 is extended through the opening hole 34 from the inside and is protruded into the guide groove 31.

The middle shell 14 which is rotatably fitted into the upper and lower concave portions 19a, 19b of the upper shell 13 and the lower shell 15 has the arrangement shown in FIGS. 1 and 5 and the like. This middle shell 14 includes a flat surface portion 40 formed of a disk-like thin plate material and a ring portion 41 continuously formed at the outer peripheral edge of the flat surface portion 40. The flat surface portion 40 of the middle shell 14 is comprised of a pair of semicircle pieces 40a, 40a formed as substantially semicircular shapes. An opening portion 42 is formed by forming a spacing between chord sides of the two semicircle pieces 40a, 40a. This opening portion 42 has a shape and a size equal to those of the opening portion 25 of the lower shell 15.

Specifically, similarly to the opening portion 25, the opening portion 42 includes a table opening portion 42a set at the central portion of the flat surface portion 40 and into and from which the turntable is inserted and ejected and head opening portions 42b, 42b set at both sides of the diametrical direction of the table opening portion 42a and to each of which an optical head is opposed respectively. On the inner peripheral edge of the flat surface portion 40 which surrounds the table opening portion 42a, there is provided a supporting edge portion 40b which supports the inner non-recording area 29b of the optical disk 11 from the lower direction in a free state.

On the outer peripheral surface of the ring portion 41 of the middle shell 14, there is provided a gear portion 43 having a large number of gear teeth over a predetermined range of the peripheral direction. As shown in FIG. 13, when the cartridge housing 12 is assembled, under the condition that the opening portion 42 of the middle shell 14 is made coincident with the opening portion 25 of the lower shell 15, this gear portion 43 is set at the position opposed to the opening window 30. The range of this gear portion 43 is set to be an angular extent slightly larger than the rotation angle of the middle shell 14. Specifically, as shown in FIGS. 15 to 19, when the pair of shutter members 18a, 18b are completely closed such that the opening portion 42 is inclined by a maximum inclination angle relative to the opening portion 25, one end of the circumferential direction of the gear portion 43 is exposed to the opening window 30. Then, when the pair of shutter members 18a, 18b are completely opened such that the middle shell 14 is rotated by a predetermined angle to cause the opening portion 42 to be laid on the opening portion 25, the other end of the circumferential direction of the gear portion 43 is exposed to the opening window 30.

On the outside of one end of the gear portion 43 of this middle shell 14, there is provided a stopper portion 44 for limiting the rotation movement amount of the middle shell 14 in such a manner that it may be protruded toward the outside of the radius direction. Since the gear portion 43 and the stopper portion 44 are projected from the outer peripheral surface of the ring portion 41 to the outside as described above, relief grooves 45a, 45b are respectively provided on the upper shell 13 and the lower shell 15 at their corresponding portions so as to avoid them from contacting with the stopper portion 44 and the like such that they can be allowed to pass. Further, on one end face of the ring portion 41, there are provided three circular-arc-like cam portions 46 (portions shown by a large number of points in FIG. 5), each having a predetermined length, continued in the circumferential direction. These cam portions 46 are respectively engaged with the three cam grooves of the upper shell 13 while the middle shell 14 is assembled on the upper shell 13. When this middle shell 14 is rotated at a predetermined angle, the respective cam portions 46 are overlaid on the three lift up portions 23, respectively.

On the other end face of the ring portion 41 of the middle shell 14, there are provided two circular-arc-like protruded rail portions 47 which are protruded in the opposite side of the cam portions 46. These protruded rail portions 47, 47 are used to limit the pair of shutter members 18a, 18b from being moved in the outside of the radius direction. To avoid the contact with these protruded rail portions 47, 47, cover portions 26a, 26a of the upper shell 13 have relief grooves 48 extended in the circumferential direction, respectively as shown in FIG. 6. Further, on the flat surface portion 40 of the middle shell 14, there are respectively provided a pair of supporting apertures 49, 49 which are used to support the pair of shutter members 18a, 18b such that the pair of shutter members become freely rotatable in the plane direction. The pair of supporting apertures 49, 49 are set on edge portions of the head opening portions 42b, 42b with respect to the table opening portion 42a in a point-symmetrical fashion.

A shutter mechanism 18 that is attached to the middle shell 14 through the pair of supporting apertures 49, 49 is comprised of the pair of shutter members 18a, 18b which are the same in shape and size. The pair of shutter members 18a, 18b have the shape and structure shown in FIGS. 7 and 8. Specifically, the pair of shutter members 18a, 18b are each formed of substantially a semicircular thin plate material. At substantially a central portion of a chord side of each of the shutter members 18a, 18b, there are provided stepped portions 50 having a predetermined length in the direction perpendicular to the cord line. This stepped portion 50 forms at its both sides a convex-side joint portion 50a and a concave-side joint portion 50b.

On the respective joint portions 50a, 50b of the shutter members 18a, 18b, there are respectively provided overhang portions 51, 51 which are overhung in the direction perpendicular to the direction in which the chords are extended. Thus, in the pair of shutter members 18a, 18b, the end face of the convex-side joint portion 50a and the end face of the concave-side joint portion 50b are respectively opposed to each other, whereby the overhang portion 51a of the convex-side joint portion 50a are overlapped on the overhang portion 51b of the concave-side joint portion 50b. Shaft portions 52 which are projected toward the overhang portions 51 side are respectively attached to shaft attachment portions 50c which are end portions of the convex-side joint portion 50a side of the chord sides of the shutter members 18a, 18b.

The shaft portions 52 are fitted into the supporting apertures 49 of the flat surface portion 40, whereby the respective shutter members 18a, 18b are rotatably attached to the middle shell 14. In this case, the pair of shutter members 18a, 18b are attached to the middle shell in such a manner that their chord sides are opposed to each other. As a result, as shown in FIG. 7, when the pair of shutter members 18a, 18b are rotated so as to become distant from each other toward outside, respectively, the respective shutter members 18a, 18b are mounted on the semicircular pieces 40a such that they are hidden by the semicircular pieces. On the other hand, when the pair of shutter members 18a, 18b are inwardly rotated such that their joint portions 50a, 50b are brought in contact with each other, a substantially circular cover portion is formed at the central portion of the opening portion 42 by the pair of shutter members 18a, 18b as shown in FIG. 8.

Further, on the concave-side joint portions 50b of the shutter members 18a, 18b, there are respectively provided open and close grooves 53 which are used to open and close the shutter members 18a, 18b. The open and close grooves 53 are extended in the radial direction from the shaft portions 52 of the shutter members 18a, 18b in which the open and close grooves are provided. The operation convex portions 27a, 27b of the lower shell 15 are slidably engaged with the open and close grooves 53. Further, at the end portions of the outsides of the respective open and close grooves 53, there are provided resilient pieces 54 formed by cutting their periphery and concave portions 53a which are used to relieve the operation convex portions 27a, 27b. On the circular-arc-like sides of the shutter members 18a, 18b, there are provided close pieces 55 which are used to close openings left after the shaft portions 52 had been moved while the shutter is being closed.

The upper shell 13, the middle shell 14, the lower shell 15 and the shutter members 18a, 18b having the above arrangements may be made of synthetic resins such as ABS resin (acrylonitrile-butadiene-styrene resin) and HIPS (high impact polystyrene). However, it is needless to say that they may be made of other synthetic resins and metal materials such as an aluminum alloy and a stainless steel.

The above middle shell 14, the operation convex portions 27a, 27b, a rack rod 70 and the like constitute a shutter opening and closing mechanism. Then, the supporting apertures 49 and the shaft portions 52 constitute a rotary coupling portion, and the operation convex portions 27a, 27b and the open and close grooves 53 constitute a movement coupling portion. Although not shown, the cartridge housing 12, for example, of the disk cartridge 10 has at its rear corner portion a write-protect mechanism for preventing information recorded on a recording medium such as an optical disk from being erased by mistake. Such write-protect mechanism can be comprised of an operation window bored on the back of the cartridge housing 12, a write-protect piece attached so as to open and close this operation window and the like.

The disk cartridge 10 having the above arrangement can be assembled with ease as follows, for example. An assembly work of this disk cartridge 10 is executed in the state in which the upper shell 13 is disposed in the lower direction. First, the optical disk 11 is installed within the upper-side concave portion 19a of the upper shell 13. At that very moment, the optical disk 11 is inserted into the upper-side concave portion 19a while its surface with the center hub 28 is being faced to the lower directions. Next, the opening side of the middle shell 14 is fitted into the upper-side concave portion 19a so as to cover the optical disk 11, whereby the optical disk 11 is rotatably stored within the disk compartment 16 comprised of the middle shell 14 and the upper shell 13. At that very moment, the direction in which the opening portion 42 of the middle shell 14 is extended is made coincident with the front and back direction of the upper shell 13 and one end of the gear portion 43 is faced to the opening window 30.

Next, the shutter mechanism 18 is assembled on the middle shell 14. In this assembly work, while the chord sides of the pair of shutter members 18a, 18b are being opposed to each other, the shaft portions 52 are respectively fitted into the supporting apertures 49 of the flat surface portion 40 in this state. Then, the respective shutter members 18a, 18b are separated from each other and are thereby overlapped on the semicircular pieces 40a of the middle shell 14. Concurrently therewith or before or after the above assembly work, the lock member 32 is attached to the supporting shaft 35 of the lock storage portion 33. In that case, the spring piece 38 of the lock member 32 is brought in contact with the inner surface of the front edge portion 13a of the upper shell 13, and the input portion 37 is projected from the opening hole 34 into the guide groove 31 under spring force of this spring piece 38.

Next, the lower shell 15 is laid over the middle shell 14 including the shutter mechanism 18, and the lower shell 15 is overlapped to the upper shell 13. At that time, the positioning convex portions 24a, 24b of the lower shell 15 are fitted into the positioning concave portions 21a, 21b of the upper shell 13, whereby the lower shell 15 is automatically and properly positioned relative to the upper shell 13. In that case, when the pair of shutter members 18a, 18b are disposed at the above positions, the pair of operation convex portions 27a, 27b provided within the lower-side concave portion 19b of the lower shell 15 can be respectively opposed to the pair of open and close grooves 53. Therefore, only by overlapping the lower shell 15 on the upper shell 13 without considering the positions of the pair of open and close grooves 53, the pair of operation convex portions 27a, 27b can be engaged with the pair of open and close grooves 53.

Thereafter, the lower shell 15 is overlapped to and fixed to the upper shell 13 by using a plurality of fixing screws. Thus, the assembly work of the disk cartridge 10 is completed. In this case, without using a fixing means comprised of independent members such as fixing screws, the joint surfaces of the upper shell 13 and the lower shell 15 can directly be joined by using a suitable means such as an adhesive agent. As described above, according to the disk cartridge 10 of this embodiment, the number of assemblies can be decreased and the assembly work can be carried out extremely easily.

In this case, the joint portions 50a, 50b of the pair of shutter members 18a, 18b have the overhang portions 51a, 51b, each having about half the thickness and these overhang portions 51a, 51b are inserted beneath the other joint portions 50a, 50b, respectively. Therefore, since the overall arrangements of the joint portions 50a, 50b are properly overlapped with each other, a labyrinth effect can be achieved so that the disk cartridge can be prevented from being smudged by dusts and the like over the whole length of the joint portions 50a, 50b. In addition, when the joint portions 50a, 50b are pressed inwardly, external force applied to the joint portions 50a, 50b is received by the overhang portions 51a, 51b located at the inside. Consequently, the engagement state between the joint portions 50a and 50b can be strengthened more by the overhang portions 51a, 51b, whereby the shutter members can be prevented from being deformed and the disk cartridge can be prevented more reliably from being smudged by dusts and the like.

FIG. 2 shows the state presented before the disk cartridge 10 having the above arrangement is loaded on the disk recording and reproducing apparatus. Specifically, the pair of shutter members 18a, 18b of the shutter mechanism 18 completely close the opening portion 25 of the lower shell 15 and the opening portion 42 of the middle shell 14 due to its own tare and frictional force generated between the lower shell 15 and the middle shell 14. Further, the three cam portions 46 of the middle shell 14 are projected from the three cam grooves 22 of the upper shell 13 and are thereby laid over the lift up portions 23. As a consequence, the pair of shutter members 18a, 18b are sandwiched between both sides by the upper shell 13 and the middle shell 14.

Further, as shown in FIG. 13 and the like, the stopper portion 36 is engaged with the gear portion 43 of the middle shell 14 under spring force of the spring piece 38 of the lock member 32. Consequently, the pair of shutter members 18a, 18b are doubly locked by a holding mechanism based on cam elevation operations and a lock mechanism based on the lock member 32. Accordingly, the state in which the opening portions 25, 42 are closed by the shutter mechanism 18 can be held with high reliability and the shutter mechanism 18 can reliably be prevented from being opened by mistake due to some cause such as vibrations.

When the disk cartridge 10 in this state is inserted into a disk recording and reproducing apparatus 60 as shown in FIGS. 25 and 26, the lock member 32 is released from the locked state by a shutter opening and closing mechanism provided in this disk recording and reproducing apparatus 60. Thereafter, this shutter opening and closing mechanism opens the shutter mechanism 18 to open the opening portions 25, 42. The manner in which this shutter mechanism 18 is opened and closed will be described in detail later on.

Next, the disk recording and reproducing apparatus 60 will be described. As shown in FIGS. 25 and 26, this disk recording and reproducing apparatus 60 comprises an outer case 61 formed of a hollow housing, a recording and reproducing apparatus body 62 stored within this outer case 61 and the like. The outer case 61 includes a case body 63 which is opened in the upper surface and the front, a case lid 64 detachably attached to the upper portion so as to close the upper surface of the case body 63, a front panel 65 detachably attached to the front portion so as to close the fronts of the case body 63 and the case lid 64 and the like.

The case body 63 is provided with four leg assemblies 63a which are projected in the lower direction. The disk recording and reproducing apparatus 60 is supported by these leg assemblies 63a and thereby attached to the proper position. The front panel 65 is formed of an oblong plate-like member, and an oblong cartridge slot 66 is formed on the upper portion of the front panel. The cartridge slot 66 has approximately the same dimension as that of the front side of the disk cartridge 10. This cartridge slot 66 is constantly closed by an open and close lid 67 disposed on the inside of the cartridge slot.

This open and close lid 67 is pressed by the front portion of the disk cartridge 10 and the disk cartridge is inserted into the cartridge slot at its predetermined position. As a result, the disk cartridge 10 is automatically loaded into the disk recording and reproducing apparatus by a loading mechanism not shown. Then, the disk cartridge 10 transported by the loading mechanism is properly located at a predetermined position and fixed thereto within the disk recording and reproducing apparatus 60. Concurrently therewith or before and after the above operation, the shutter opening and closing mechanism provided in the disk recording and reproducing apparatus 60 operates the shutter mechanism 18 to open the opening portions 25, 42.

Thereafter, a turntable 68a of a disk rotary drive apparatus 68 and an optical head 69a of an optical pickup device 69 are entered into the opening portions 25, 42 thus opened. Then, the turntable 68a is engaged with the center aperture 11a of the optical disk 11 and the center hub 28 is attracted and held by a magnet incorporated within the turntable 63a. Concurrently therewith or before and after the above operation, the optical head 69a is approached to a predetermined position of the information recording area 29a of the optical disk 11, whereby the disk recording and reproducing apparatus 60 becomes able to record an information signal on the optical disk 11 and to reproduce a recorded information signal from the optical disk.

The recording and reproducing apparatus body 62 of the disk recording and reproducing apparatus 60 comprises constituents shown in FIG. 24, for example. Specifically, the recording and reproducing apparatus body 62 includes three control apparatus of a system controller S1, a memory controller S5 and a drive controller D1. The system controller S1 and the memory controller S5 are directly connected, and a read-only memory apparatus (ROM) S2 and a read and write memory apparatus (RAM) S3 are connected to a connection line between the system controller and the memory controller. Further, a memory S4 and MPEG 2 (moving picture compression system applied to existing television broadcasting capable of 3M to 40 Mbps, HDTV and broadband ISDN) encoder S6 and decoder S7 are connected to the memory controller S5. Further, a control panel S8 and a remote control receiving section S9 are connected to the system controller S1.

An ECC D4 is connected to the drive controller D1, and a memory apparatus (ROM) D2, a memory apparatus (RAM) D3, a servo circuit D6 and an address decoder D7 are connected to a connection line between the drive controller and the ECC. Further, the drive controller D1 is connected with a recording error judgment circuit D8 for judging whether or not an error occurred upon recording. This drive controller D1 is connected through a command interface to the system controller S1. The drive controller is connected through the ECC D4 and a data interface to the memory controller S5 and a modem circuit D5. Then, the modem circuit D5 is also connected to the optical head 69a of the optical pickup device 69.

The servo circuit D6 is connected to a spindle motor 68 which is serving as a disk rotary drive apparatus, the optical pickup device 69 and the recording error judgment circuit D8. Further, the optical pickup device 69 is connected to an address decoder D7, and this address decoder D7 is also connected to the recording error judgment circuit D8.

When the disk cartridge 10 is inserted into the disk recording and reproducing apparatus 60 having the above arrangement from the cartridge slot 66, as shown in FIG. 13, a rack rod 70 which shows a practical example of the shutter opening and closing mechanism incorporated within the disk recording and reproducing apparatus 60 is entered into the guide groove 31 formed on one side portion of the disk cartridge 10, whereby the input portion 37 of the lock member 32 projected into the guide groove 31 is pushed into the lock storage portion 33 by pressing force of the rack rod 70 against spring force of the spring piece 38. Further, when the rack rod 70 is advanced relatively, the tip end of the gear portion 70a is meshed with the gear portion 43 of the middle shell 14.

Figure 14:
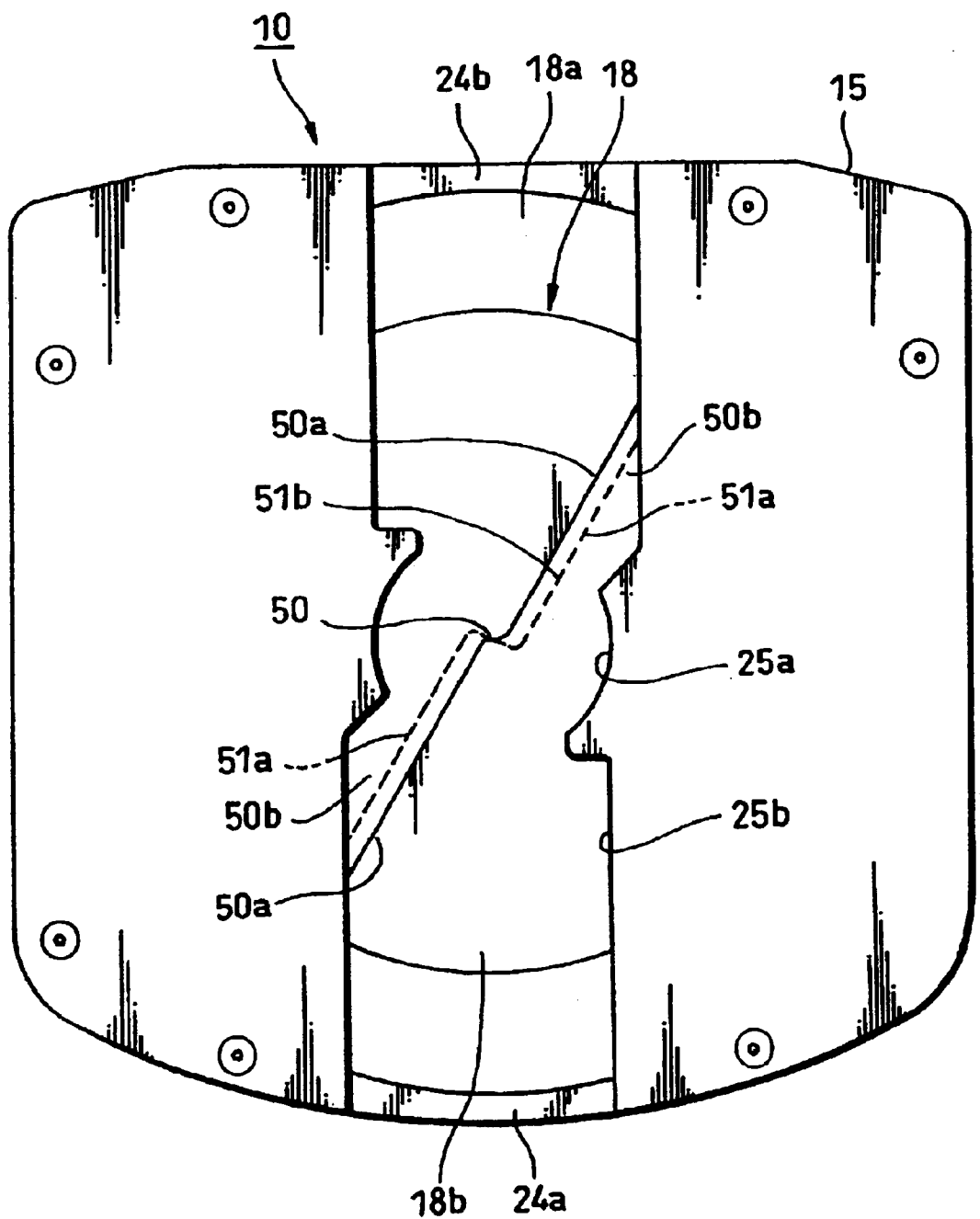
FIG. 14 is a plan view showing the outward appearance state of FIG. 13 from the lower shell side.

This gear portion 43 is meshed with the gear portion 70a of the rack rod 70, whereby the middle shell 14 is rotated in response to the moved amount of the rack rod 70 as shown in FIGS. 13 to 19. FIGS. 13 and 14 show the state presented before the gear portion 70a of the rack rod 70 is meshed with the gear portion 43 of the middle shell 14. In this state, the convex-side joint portion 50a and the concave-side joint portion 50b of the pair of shutter members 18a, 18b are urged against with each other and are thereby closely contacted with each other. At that very time, since the opening portion 42 of the middle shell 14 is located at the inclined position relative to the opening portion 25 of the lower shell 15, although only the central portion in which the two opening portions 25, 42 are overlapped with each other is opened, that opening portion is closed by the pair of shutter members 18a, 18b. Accordingly, the disk compartment 16 can be prevented from being smudged by dusts and the like from the overlapping portion of the opening portions 25, 42.

The shaft attachment portions 50c of the pair of shutter members 18a 18b are interposed at the portions in which the opening portions 25 and 42 are close to each other with an acute angle, and the shaft attachment portion 50c is located at the inside of one cover portion 26b, thereby removing the space. The closing piece 55 is interposed at the inside of the other cover member 26a, and this closing piece 55 is located at the inside of the other cover member 26a, thereby removing the space. Further, the open and close grooves 53 provided on the pair of shutter members 18a, 18b are respectively closed by the lower shell 15. Therefore, since all spaces from the opening portion 25 of the lower shell 15 to the opening portion 42 of the middle shell 14 are completely closed by the pair of shutter members 18a, 18b, the disk compartment 16 can be prevented from being smudged by dusts and the like through the opening portions 25, 42.

In this state, when the rack rod 70 is being entered into the guide groove 31 as the disk cartridge 10 is being inserted into the disk recording and reproducing apparatus and the gear portion 70a and the gear portion 43 of the middle shell 14 commence to be meshed with each other, the middle shell 14 is rotated in the counter-clockwise direction in FIG. 13. In this case, in the initial state in which the middle shell 14 commences to rotate, as shown in FIGS. 20C and 21A, the cam portion 46 is laid over the lift up portion 23 and sandwiches the pair of shutter members 18a, 18b between it and the upper shell 13 so that relatively large force is required to rotate the middle shell 14. When the middle shell 14 is rotated against large frictional force generated from the cam portion 46 so that the cam portion 46 passes the lift up portion 23 and enters the cam groove 22 as shown in FIGS. 20B and 21B, frictional force of the cam portion 46 is lost. Consequently, the middle shell 14 will be able to rotate extremely lightly and smoothly.

At that time, while the respective shaft portions 52 of the pair of shutter members 18a, 18b are similarly rotated as the middle shell 14 is rotated, the operation convex portions 27a, 27b of the lower shell 15 are slidably engaged with the open and close grooves 54 provided on the other end side. The pair of operation convex portions 27a, 27b are provided on the lower shell 15 and the operation convex portions 27a, 27b are never moved. On the other hand, the open and close grooves 53 are extended in the direction S connecting the shaft portion 52 and the operation convex portion 27b (or 27a) in such a manner that they can be relatively moved within the operation convex portions 27a, 27b as the shutter members 18a, 18b are rotated.

As a result, the operation convex portion 27b (or 27a) is moved within the open and close groove 53 toward the shaft portion 52 side in response to the rotation amounts of the shutter members 18a, 18b. Thus, in each of the shutter members 18a, 18b, the shaft portion 52 is moved toward the corresponding operation convex portion 27b (27a) side. Consequently, the respective shutter members 18a, 18b are moved on the corresponding semicircular pieces 40a from the state shown in FIG. 15 through the states shown in FIGS. 16, 17 and 18 as shown in FIG. 19. Thus, the respective shatter members 18a, 18b are overlapped on the semicircular pieces 40a so that the upper and lower opening portions 25, 42 are opened completely as shown in FIG. 9 and the like. Therefore, a part of the optical disk 11 stored within the disk compartment 16 is exposed through the opening portions 25, 42.

As a consequence, as shown in FIG. 12, the turntable 68a and the optical head 69a can be inserted into the opening portions 25, 42. Accordingly, the turntable 68a or the like is moved toward the disk cartridge 10 side or the disk cartridge 10 is moved toward the turntable 68a side, whereby the turntable 68a is entered into the table opening portion 25a provided at the central portion and the optical head 69a is entered into the head opening portion 25b provided at both sides. As a result, the optical disk 11 is loaded on and chucked to the turntable 65a and the optical head 69a is opposed to the information recording area 29a of the optical disk 11 with a predetermined space with the result that the disk recording and reproducing apparatus 60 becomes able to reproduce or record an information signal from or on the information recording area 29a of the optical disk 11.

Accordingly, the recording and reproducing apparatus body 62 is operated, the optical disk 11 is rotated by driving the spindle motor 68 through the turntable 68a, laser light is emitted from the optical head 69a by driving the optical pickup device 69 and the information signal recorded before can be read out from the information recording area 29a or a new information signal can be recorded on the information recording area 29a. Thus, the recording and reproducing apparatus body 62 can reproduce or record the information signal.

After the information signal had been reproduced or recorded as described above, when a user operates a cartridge eject button (not shown) provided on the disk recording and reproducing apparatus 60, for example, the disk cartridge 10 is ejected from the disk recording and reproducing apparatus 60 through the operation of the loading mechanism. Specifically, when the disk cartridge 10 is moved toward the cartridge slot 66 side by the eject operation of the loading mechanism, the rack rod 70 is retreated relatively.

When the rack rod 70 is retreated, the middle shell 14 and the pair of shutter members 18a, 18b are operated in the manner opposite to the above manner in which the optical disk is inserted into the recording and reproducing apparatus. Specifically, in the state in which the pair of shutter members 18a, 18b are completely opened as shown in FIG. 19, the middle shell 14 and the pair of shutter members 18a, 18b are rotated in the clockwise direction and the middle shell and the pair of shutter members are changed to the state shown in FIG. 15 through the states shown in FIGS. 18, 17 and 16. In the states shown in FIGS. 19 to 15, the cam portion 46 of the middle shell 14 exists within the cam groove 22 so that the middle shell 14 can be rotated by small force F.

Figure 15:
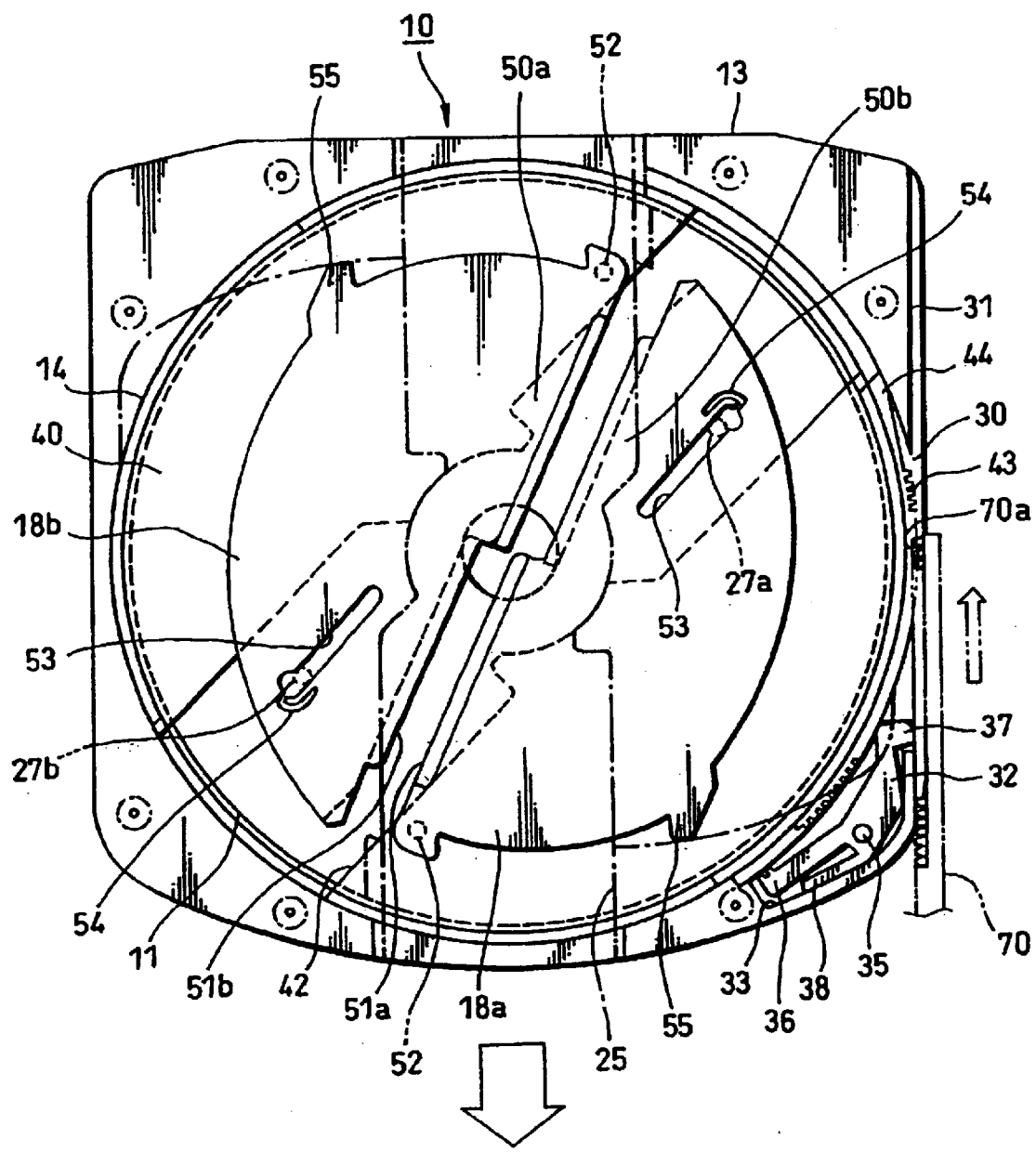
FIG. 15 is an explanatory diagram showing the state in which the middle shell is rotated a little from the state shown in FIG. 13 so that the pair of shutter members are opened a little.
Figure 16:
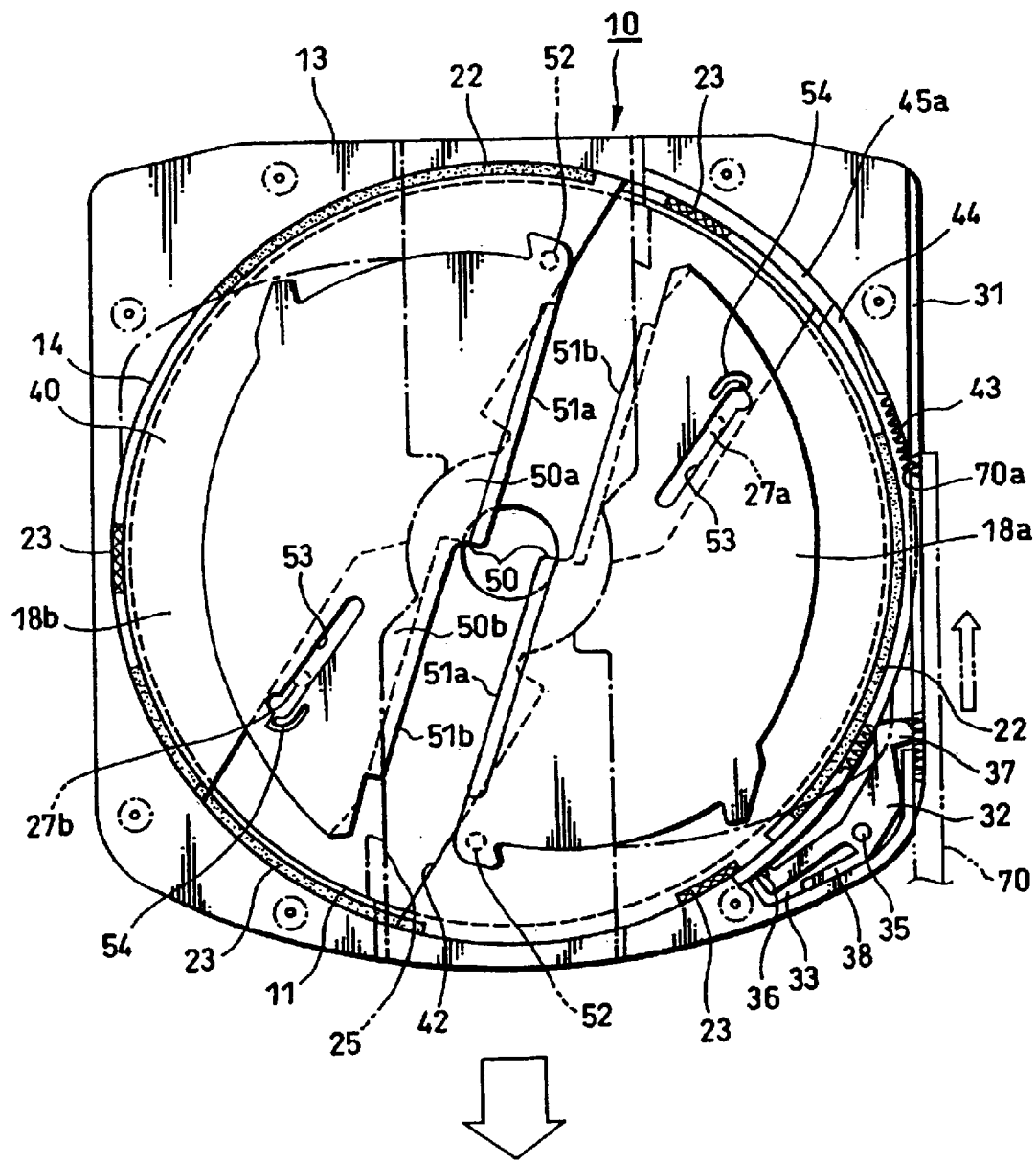
FIG. 16 is an explanatory diagram showing the state in which the middle shell is further rotated a little from the state shown in FIG. 15 so that the pair of shutter members are further opened a little.
Figure 17:
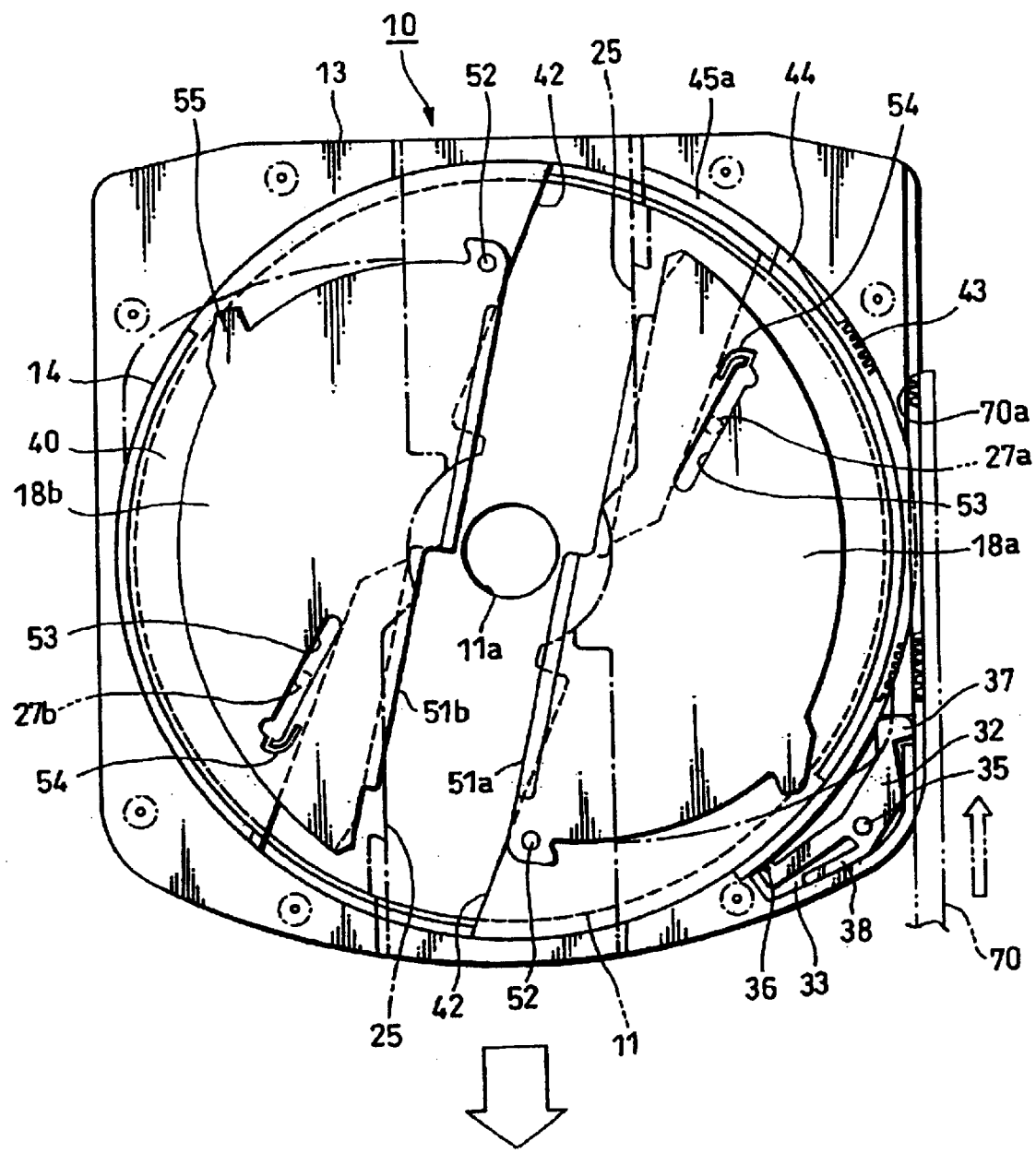
FIG. 17 is an explanatory diagram showing the state in which the middle shell is still further rotated from the state shown in FIG. 16 so that the pair of shutter members are still further opened a little.
Figure 18:
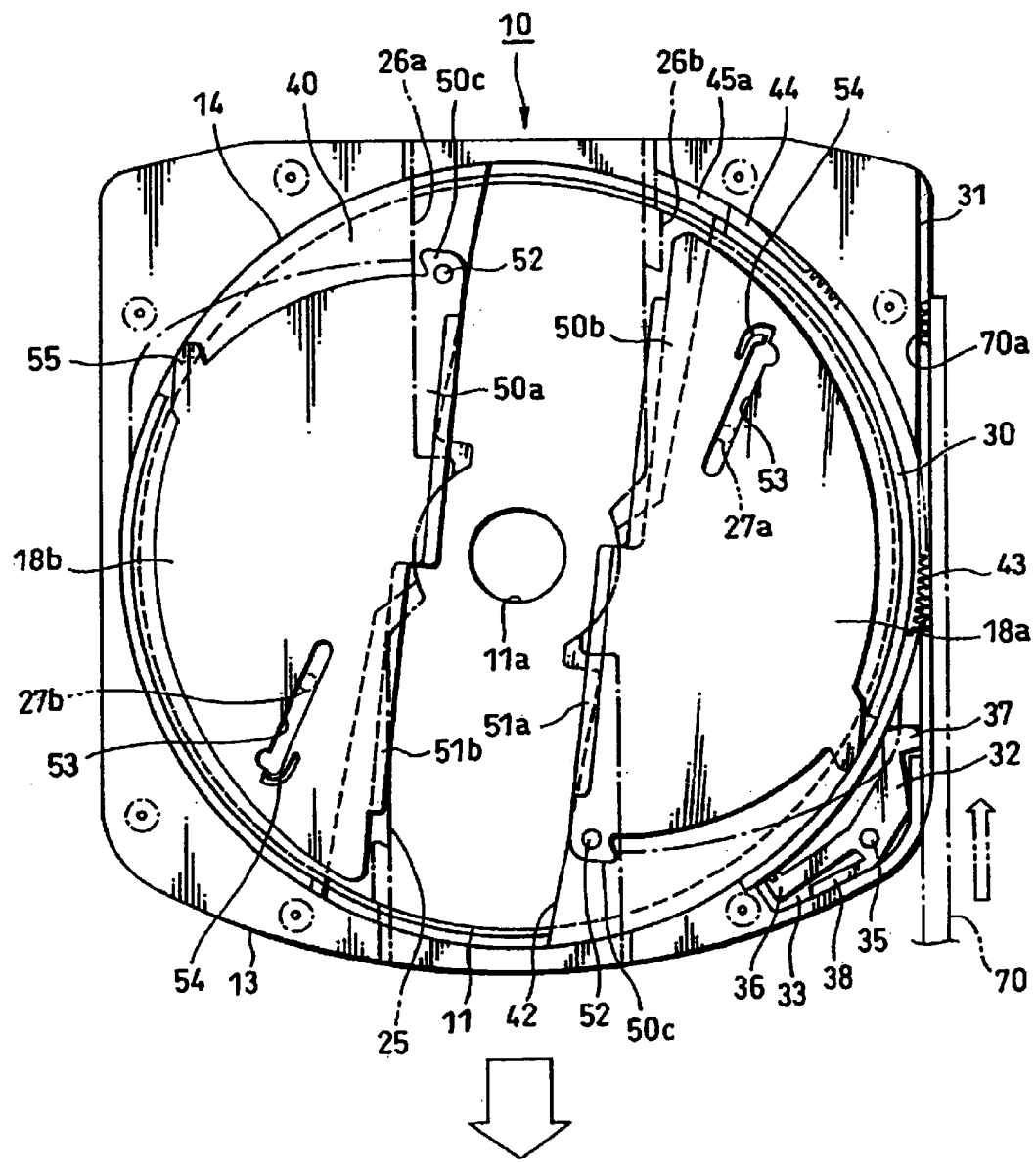
FIG. 18 is an explanatory diagram showing the state in which the middle shell is still further rotated from the state shown in FIG. 17 so that the pair of shutter members are still further opened a little.

Next, when the middle shell 14 is changed from the state shown in FIG. 15 to the state shown in FIG. 13, since the cam portion 46 is brought in contact with the lift up portion 23 and then laid over the lift up portion 23 so that the above frictional force is applied to the rotation of the middle shell 14. Then, immediately before the closed state shown in FIG. 13, the operation convex portion 27b (or 27a) moves the open and close groove 53 to the outermost portion so that the open and close groove comes in contact with and presses the resilient piece 54. As a result, spring force X is generated in the resilient piece 54 by pressing force of the operation convex portion 27b (or 27a). Under spring force X of this resilient piece 54, urging contact force Y which is acting on the other shutter member 18a (or 18b) is generated in the central stepped portion 50.

Since this urging contact force Y is generated in both of the pair of shutter members 18a, 18b, the airtightness of the pair of shutter members 18a, 18b can be improved more by their urging contact force Y. Accordingly, the disk compartment 16 can be more effectively prevented from being smudged by dusts and the like by improving the dustproof property at the joint portion of the pair of shutter members 18b, 18b.

Thereafter, after the gear portion 70a of the rack rod 70 had been disengaged from the gear portion 43, the rack rod 70 is passed through the opening hole 34, whereby the input portion 37 of the lock member 32 is projected from the opening hole 34 into the guide groove 31. Concurrently therewith, the stopper portion 36 is moved to the inside and is thereby meshed with the gear portion 43. As a result, the middle shell 14 is locked by the lock member 32 and its rotation is thereby stopped. Then, as shown in FIGS. 10 and 11, the whole of the opening portions 25, 42 is completely closed by the pair of shutter members 18a, 18b.

FIGS. 22 and 23 show a disk cartridge according to a second embodiment of the present invention. A disk cartridge 80 shown in this embodiment is of one-head type disk cartridge for use in a disk recording and reproducing apparatus using one head. As will be clear from FIG. 22, this disk cartridge 80 differs from the disk cartridge 10 shown in FIG. 1 and the like only in a lower shell 85. Therefore, elements and parts identical to those of FIG. 1 are marked with the identical reference numerals and need not be described. Only an opening portion 86 of the lower shell 85 having different arrangement will be described.

The opening portion 86 of the lower shell 85 has the same shape and arrangement as those of the opening portion 25 of the above lower shell 15 from which only one head opening 25b is removed. Other shapes and arrangements are the same. The one head disk cartridge 80 can easily be manufactured by using the one head lower shell 85 instead of the 2-head lower shell 15, and hence the present invention can easily cope with a one-head type disk recording and reproducing apparatus and a two-head type disk recording and reproducing apparatus. In addition, according to this embodiment, the manufacturing and assembling lines can be made common and the present invention can properly cope with users' needs.

While the present invention has been described so far, the present invention is not limited to the above embodiments. For example, while the optical disk has been used as the information recording medium as described above, the present invention is not limited thereto and can be applied to magnetic disks such as a magnetooptical disk and a floppy disk and other various kinds of disk-like recording mediums. Further, while the present invention has been applied to the disk recording and reproducing apparatus for both of recording and reproduction as the information recording and reproducing apparatus as described above, the present invention is not limited thereto and can, of course, be applied to a disk recording apparatus or a disk reproducing apparatus which is capable of either recording or reproducing a disk.

While the opening portions 42, 25 are provided on the middle shell 14 and the lower shell 15 of the cartridge housing 12 as described above, the present invention is not limited thereto and the opening portion may be provided on the upper shell 13, for example, so that the disk can be accessed simultaneously from upper and lower directions of the cartridge housing 12. Further, the disk compartment may be comprised of the middle shell and the lower shell, the disk-like recording medium may be stored within the disk compartment and the opening portion may be provided on the upper shell. As described above, the present invention may be variously modified without departing from the gist thereof.

As set forth above, according to the disk of the present invention, in the disk cartridge comprising the cartridge housing having the disk compartment, the disk-like recording medium and the pair of shutter members, since the disk cartridge includes the shutter opening and closing mechanism for moving the pair of shutter members based on the rotation of the middle shell to thereby open and close the opening portion, the middle shell is rotated and the pair of shutter members are rotated by the operation of the shutter opening and closing mechanism so that the opening portion from which a part of the disk-like medium is exposed is smoothly and reliably be opened and closed. Therefore, the disk compartment can be prevented from being smudged by very small dusts and the like by reducing the space between the pair of shutter members and the cartridge housing, and there is provided the cartridge housing with excellent dustproof property. Moreover, in the disk cartridge thus provided, the number of parts are reduced, the structure is simple, the productivity is superior, the thickness is thin, the size is compact, and the dust-proof property is excellent since the disk cartridge is constituted of three shells of the upper, lower, and middle, the pair of shutter members and the lock member.

According to the disk cartridge of the present invention, since the pair of shutter members are comprised of a combination of two substantially semicircular same plate materials and the pair of shutter members are disposed symmetrically across the opening portion on the same plane, the opening portion of the wide range can be opened and closed while the areas of the shutter members are being reduced. Thus, while an efficiency with which the opening portion is opened and closed is being increased, the whole of the disk cartridge can be made compact and thin.

According to the disk cartridge of the present invention, since the shutter opening and closing mechanism includes the rotary coupling portion and the movement coupling portion so that the pair of shutter members are opened and closed by the rotation of the middle shell to thereby open and close the opening portion, the pair of shutter members are rotated based on the rotation of the middle shell so that the opening portion can smoothly and reliably be opened and closed.

According to the disk cartridge of the present invention, since the rotary coupling portion is comprised of a combination of a shaft portion and an engagement hole and the movement coupling portion is comprised of a combination of a guide groove and an operation convex portion, the pair of shutter members can be operated with high reliability and the opening portion can smoothly and reliably be opened and closed.

According to the disk cartridge of the present invention, since the opening portion is shaped such that it extends in the diametrical direction through the central portions of the middle shell and the like, two head portions can simultaneously be faced into the opening portion, whereby two operations (e.g., writing and reading of information signal can be carried out, writing or reading of two places can be carried out simultaneously, etc.) can be carried out at the same time.

So, the very convenient disk cartridge which can execute plural functions at the same time is provided.

According to the disk cartridge of the present invention, since the disk cartridge comprises the shutter opening and closing mechanism for opening and closing the opening portion by moving the pair of shutter members based on the rotation of the middle shell and the elevation mechanism for moving the middle shell in the direction perpendicular to the rotation direction based on the rotation of the middle shell, the pair of shutter members can smoothly and reliably be rotated by rotating the middle shell and the middle shell can be ascended and descended and pressed against the upper shell or the lower shell when the middle shell is rotated. Therefore, the space can be removed or reduced by closely contacting the middle shell with the upper shell or the lower shell so that the disk compartment can be prevented from being smudged by very small dusts and the like, thereby improving the dustproof property of the cartridge housing. Moreover, the thickness of the cartridge housing can be decreased and the space factor can be improved and the whole of the disk cartridge can be made compact and thin as well as the dust-proof property is excellent.

According to the disk cartridge of the present invention, since the pair of guide grooves are provided on one of the pair of shutter members and the cartridge housing and the pair of operation convex portions are provided on the other of the pair of guide grooves and the pair of operation convex portions and the guide grooves are moved along the operation convex portions based on the rotation of the middle shell, the pair of shutter members can smoothly and reliably be moved, whereby the opening portion of the wide range can be opened and closed.

According to the disk cartridge of the present invention, since the pair of shutter members are comprised of the combination of two substantially semicircular same plate materials, the guide grooves are provided on one side portions of the respective shutter members, the pivots are provided on the other side portions and the pivots are supported by the middle shell so as to become freely rotatable, the opening portion of the wide range can be opened and closed while the areas of the shutter members are being reduced. Thus, an efficiency with which the opening portion is opened and closed can be increased, and the whole of the disk cartridge can be made compact and thin.

According to the disk cartridge of the present invention, since the cam grooves or the cam convex portions are provided on the upper shell or the lower shell and the cam convex portions or the cam grooves are provided on the middle shell to thereby constitute the elevation mechanism, the pair of shutter members can be sandwiched by the upper shell or the lower shell and the middle shell as the middle shell is rotated, the space can be removed by closely contacting the middle shell with the upper shell or the lower shell so that the disk compartment can be prevented from being smudged by very small dusts and the like. Thus, the dustproof property of the cartridge housing can be improved.

According to the disk cartridge of the present invention, in the disk cartridge including the cartridge housing having the disk compartment, the disk-like recording medium and the pair of shutter members, since the gear portion formed around the outer peripheral surface of the middle shell is exposed from the opening window provided on the side surface of the upper shell and the lower shell, the middle shell can be rotated by the simple shutter opening and closing mechanism such as the rack rod disposed on the outside, and the pair of shutter members can smoothly and reliably be rotated based on the rotation of the middle shell. Therefore, the shutter opening and closing mechanism can be constructed extremely easily. In addition, the disk compartment can be prevented from being smudged by very small dusts and the like by miniaturizing the space between the pair of shutter members and the cartridge housing. Thus, the dustproof effect of the cartridge housing can be improved and the disk cartridge can be decreased in size and thickness and improved in space factor. There can be achieved the effects that the whole of the disk cartridge can be made compact and thin.

According to the disk cartridge of the present invention, since the disk cartridge has the arrangement in which the pair of shutter members are comprised of a combination of the same two substantially semicircular plate materials, the respective shutter members are symmetrically disposed across the opening portion, the guide grooves are provided on one side portions of the chord sides of the respective shutter members and the shaft portions provided on the other side portions are rotatably supported by the middle shell, the opening portion of the wide range can be opened and closed while the areas of the shutter members are being decreased. Thus, the opening and closing efficiency of the opening portion can be improved and the whole of the disk cartridge can be made compact and thin.

According to the disk cartridge of the present invention, since the disk cartridge has the arrangement in which the pair of guide grooves are provided on one of the pair of shutter members and the cartridge housing and the pair of operation convex portions are provided on the other so that the guide grooves may be moved along the operation convex portions based on the rotation of the middle shell, the pair of shutter members are opened and closed by the rotation of the middle shell to thereby open and close the opening portion and the pair of shutter members can be rotated smoothly and reliably.

According to the disk cartridge of the present invention, since the disk cartridge has the arrangement in which the opening portion is extended through the central portion of the cartridge housing to the diametrical direction of the disk-like recording medium, the two head portions can be inserted into and ejected from the opening portion simultaneously so that the two head portions are faced into the opening portion simultaneously and two operations (e.g., writing and reading of an information signal, writing or reading of an information signal at two places at the same time, etc.) can be carried out simultaneously. There can be achieved the effect that the useful disk cartridge can be provided. Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A disk cartridge comprising:

a cartridge housing in which a disk compartment is formed between an upper shell and a middle shell or between said middle shell and a lower shell by overlapping said upper shell, said middle shell and said lower shell and in which said middle shell is rotatably supported by said upper shell and said lower shell;

a disk shaped recording medium stored within said disk compartment so as to become freely rotatable;

a pair of shutter members attached to said middle shell in such a manner that they can be moved in a flat surface direction on the same plane;

a shutter opening and closing mechanism for opening and closing a portion to be opened by moving said pair of shutter members based on the rotation of said middle shell; and wherein said pair of shutter members are comprised of a combination of two substantially semicircular same plate materials and said shutter members are symmetrically disposed on one surface side of said middle shell across said portion to be opened.

2. A disk cartridge according to claim 1, wherein said shutter opening and closing mechanism includes rotary coupling portions respectively provided on one side portions of said pair of shutter members and which are coupled to said middle shell so as to become freely rotatable and movement coupling portions respectively provided on the other side portions of said respective shutter members and which are coupled to said lower shell or said upper shell so as to become movable relatively and said shutter opening and closing mechanism opens and closes said opening portion by rotating said pair of shutter members around said rotary coupling members based on the rotation of said middle shell to thereby relatively move said movement coupling portions.

3. A disk cartridge according to claim 2, wherein said rotary coupling portion is comprised of a combination of a shaft portion provided on one of said pair of shutter members and said middle shell and an engagement hole provided on the other of said pair of shutter members and said middle shell, said movement coupling portion is comprised of a combination of a guide groove provided on one of said pair of shutter members and said lower shell or said upper shell and an operation convex portion provided on the other of said pair of shutter members and said lower shell or said upper shell and said pair of shutter members are enabled to execute said open and close operation of said opening portion by moving said guide groove along said operation convex portion based on the rotation of said middle shell.

4. A disk cartridge according to claim 1, wherein said portion to be opened is extended in the linear direction through respective central portions of said middle shell and said lower shell or said middle shell and said upper shell.

5. A disk cartridge according to claim 1, wherein an elevation mechanism for moving said middle shell in the direction perpendicular to said rotation direction based on the rotation of said middle shell so that said middle shell is pressed against said lower shell or said upper shell.

6. A disk cartridge according to claim 5, wherein said shutter opening and closing mechanism includes a pair of guide grooves provided on one of said pair of shutter members and said cartridge housing and a pair of operation convex portions provided on the other of said pair of shutter members and said cartridge housing and which are slidably engaged with said guide grooves, and said pair of shutter members are enabled to open and close said opening portion by moving said guide grooves along said operation convex portions based on the rotation of said middle shell.

7. A disk cartridge according to claim 5, wherein guide grooves are provided on one side portions of chord sides of said respective shutter members and pivots provided on the other side portions of said chord sides are supported by said middle shell so as to become freely rotatable.

8. A disk cartridge according to claim 5, wherein said elevation mechanism is comprised of a plurality of circular-arc-like cam grooves or cam convex portions provided in the circumferential direction of said upper shell or said lower shell at a predetermined interval and which are concaved or convexed in said direction in which said upper shell, said middle shell and said lower shell are overlapped and cam convex portions or cam grooves provided in the circumferential direction of said middle shell at a predetermined interval and which are slidably engaged with said cam grooves or said cam convex portions.

9. A disk cartridge according to claim 1, wherein a gear portion is provided on the outer peripheral surface of said middle shell over a predetermined range of the circumferential direction and an opening window from which a part of said gear portion is exposed is bored through the side surface of said upper shell and said lower shell.

10. A disk cartridge according to claim 9, wherein a guide groove is provided on one side portion of a chord side in each of said shutter members and a shaft portion provided on the other side portion of said chord side is rotatably supported by said middle shell.

11. A disk cartridge according to claim 10, wherein a pair of guide grooves are provided on one of said pair of shutter members and said cartridge housing, a pair of operation convex portions which are slidably engaged with said guide grooves are provided on the other of said pair of shutter members and said cartridge housing, said guide grooves are moved along said operation convex portions based on the rotation of said middle shell, whereby said pair of shutter members are enabled to open and close said opening portion.

12. A disk cartridge according to claim 9, wherein said portion to be be opened is extended in the linear direction through central portions of said middle shell and said lower shell or said middle shell and said upper shell.

\* \* \* \* \*